United States Patent
Momo et al.

(10) Patent No.: US 10,153,479 B2
(45) Date of Patent: Dec. 11, 2018

(54) APPARATUS, SECONDARY BATTERY, ELECTRONIC DEVICE, AND BATTERY MANAGEMENT UNIT

(71) Applicant: Semiconductor Energy Laboratory Co., LTD., Atsugi-shi, Kanagawa-ken (JP)

(72) Inventors: Junpei Momo, Kanagawa (JP); Yohei Momma, Kanagawa (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 379 days.

(21) Appl. No.: 14/886,298

(22) Filed: Oct. 19, 2015

(65) Prior Publication Data
US 2016/0111710 A1   Apr. 21, 2016

(30) Foreign Application Priority Data

Oct. 21, 2014   (JP) ................................. 2014-214146
Oct. 28, 2014   (JP) ................................. 2014-219174

(51) Int. Cl.
*H01M 4/04*   (2006.01)
*H01M 10/04*   (2006.01)

(52) U.S. Cl.
CPC ..... *H01M 4/0438* (2013.01); *H01M 10/0404* (2013.01); *H01M 10/0409* (2013.01)

(58) Field of Classification Search
CPC .. H01M 4/0438; H01M 4/044; H01M 4/0442; H01M 4/0445; H01M 4/0447; H01M 4/045; H01M 4/0452; H01M 10/0404; H01M 10/0409
See application file for complete search history.

(56) References Cited

U.S. PATENT DOCUMENTS

| | | | | |
|---|---|---|---|---|
| 3,959,112 A | * | 5/1976 | Arend, Jr. | ................ C25C 7/00 204/273 |
| 4,048,028 A | * | 9/1977 | Moeglich | ................ C02F 1/288 205/144 |
| 4,764,853 A | | 8/1988 | Thomas et al. | |
| 4,892,629 A | * | 1/1990 | Glen | ..................... C25D 11/34 205/333 |
| 6,134,902 A | | 10/2000 | Curry | |
| 7,179,561 B2 | | 2/2007 | Niu et al. | |

(Continued)

FOREIGN PATENT DOCUMENTS

| | | |
|---|---|---|
| JP | 08-255635 A | 10/1996 |
| JP | 10-223259 A | 8/1998 |

(Continued)

*Primary Examiner* — Ciel P Thomas
(74) *Attorney, Agent, or Firm* — Nixon Peabody LLP; Jeffrey L. Costellia

(57) ABSTRACT

A fabricating method and a fabricating apparatus for a lithium-ion secondary battery having stable charge characteristics and lifetime characteristics are provided. A positive electrode is subjected to an electrochemical reaction in a large amount of electrolyte solution in advance before a secondary battery is completed. In this manner, the positive electrode can have stability. In a manner similar to that of the positive electrode, a negative electrode is also subjected to the electrochemical reaction in a large amount of the electrolyte solution in advance, whereby a high reliable secondary battery can be manufactured.

14 Claims, 23 Drawing Sheets

(56) References Cited

U.S. PATENT DOCUMENTS

| | | |
|---|---|---|
| 7,745,047 B2 | 6/2010 | Zhamu et al. |
| 7,842,432 B2 | 11/2010 | Niu et al. |
| 7,939,218 B2 | 5/2011 | Niu |
| 7,977,007 B2 | 7/2011 | Niu et al. |
| 7,977,013 B2 | 7/2011 | Niu et al. |
| 8,278,011 B2 | 10/2012 | Zhu et al. |
| 8,884,845 B2 | 11/2014 | Yamazaki et al. |
| 2004/0004005 A1* | 1/2004 | Sheldon ............... C25B 1/04 205/630 |
| 2005/0079423 A1 | 4/2005 | Matsubara et al. |
| 2005/0245784 A1* | 11/2005 | Carson ................ A61L 2/025 588/302 |
| 2007/0295718 A1 | 12/2007 | Takei et al. |
| 2008/0254296 A1 | 10/2008 | Handa et al. |
| 2008/0261112 A1 | 10/2008 | Nagata et al. |
| 2009/0026083 A1* | 1/2009 | Tachibana ............ C25D 21/18 205/101 |
| 2009/0045680 A1 | 2/2009 | Litch et al. |
| 2009/0070988 A1 | 3/2009 | Honda et al. |
| 2009/0123850 A1 | 5/2009 | Takeuchi et al. |
| 2010/0035093 A1 | 2/2010 | Ruoff et al. |
| 2010/0081057 A1 | 4/2010 | Liu et al. |
| 2010/0143798 A1 | 6/2010 | Zhamu et al. |
| 2010/0176337 A1 | 7/2010 | Zhamu et al. |
| 2010/0248034 A1 | 9/2010 | Oki et al. |
| 2010/0310941 A1 | 12/2010 | Kumta et al. |
| 2010/0330421 A1 | 12/2010 | Cui et al. |
| 2011/0012067 A1 | 1/2011 | Kay |
| 2011/0111303 A1 | 5/2011 | Kung et al. |
| 2011/0121240 A1 | 5/2011 | Amine et al. |
| 2011/0159372 A1 | 6/2011 | Zhamu et al. |
| 2011/0229795 A1 | 9/2011 | Niu et al. |
| 2011/0244328 A1 | 10/2011 | Iriyama et al. |
| 2011/0291240 A1 | 12/2011 | Yamazaki |
| 2011/0292564 A1 | 12/2011 | Yamazaki |
| 2013/0017443 A1 | 1/2013 | Yamazaki |
| 2013/0067726 A1 | 3/2013 | Kuriki et al. |
| 2014/0367279 A1* | 12/2014 | Brogan ............... C25D 21/12 205/794 |
| 2016/0006017 A1 | 1/2016 | Momma et al. |

FOREIGN PATENT DOCUMENTS

| | | |
|---|---|---|
| JP | 2002-093411 A | 3/2002 |
| JP | 2005-157317 | 6/2005 |
| JP | 2006-190556 A | 7/2006 |
| JP | 2006-216451 A | 8/2006 |
| JP | 2008-098155 A | 4/2008 |
| JP | 2009-076372 A | 4/2009 |
| JP | 2013-069418 A | 4/2013 |

* cited by examiner

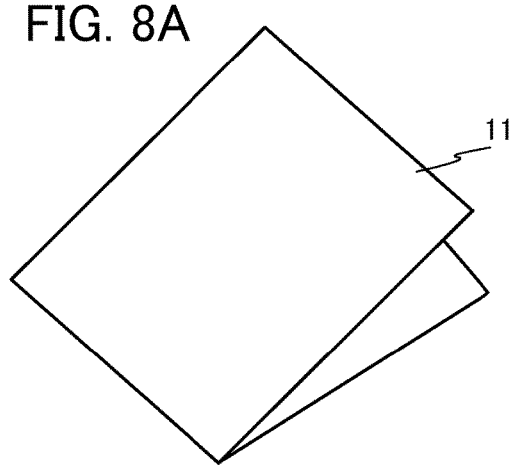
FIG. 8A
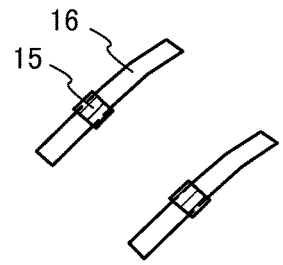
FIG. 8C
FIG. 8B
FIG. 8D
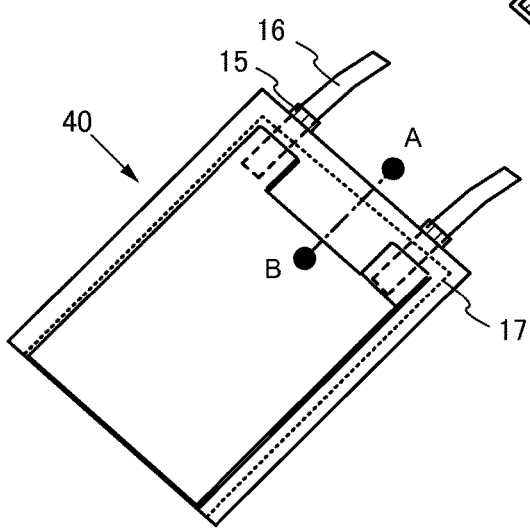
FIG. 8F
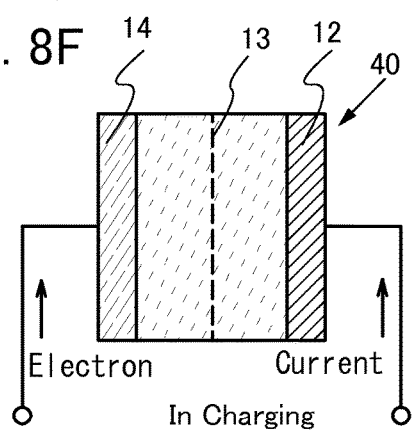
FIG. 8E
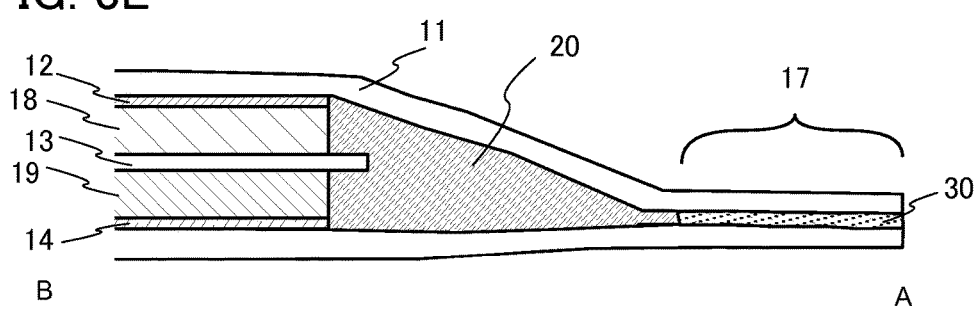

FIG. 11A1
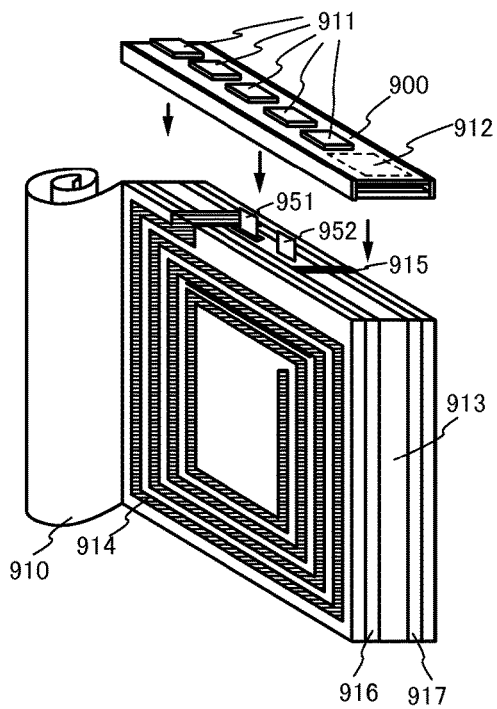
FIG. 11A2
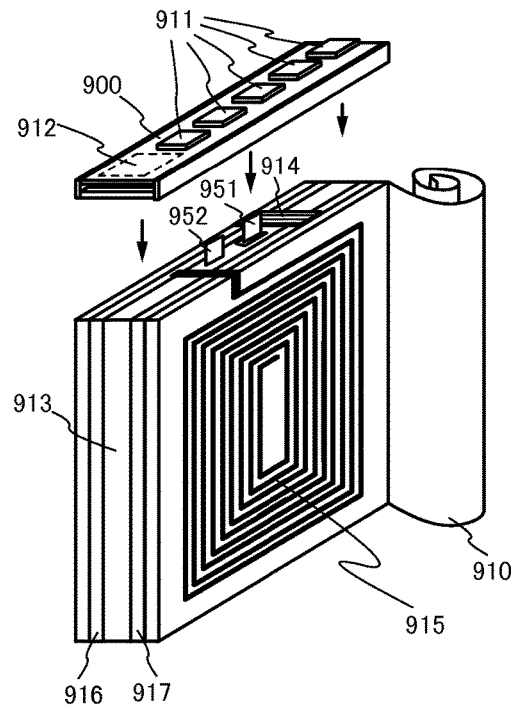
FIG. 11B1
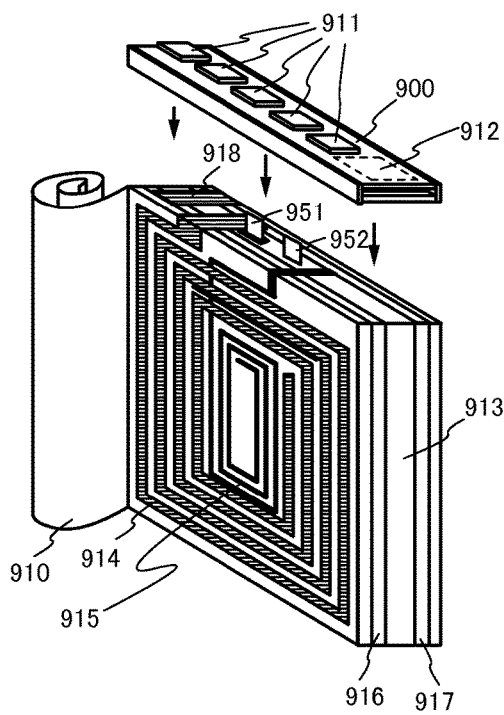
FIG. 11B2
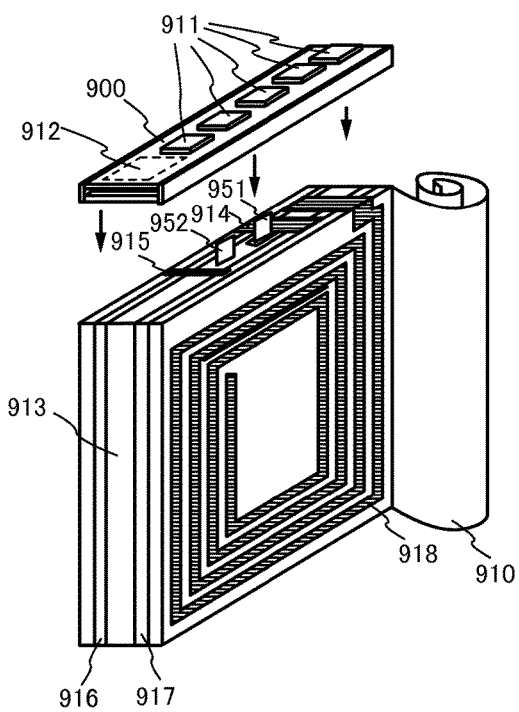

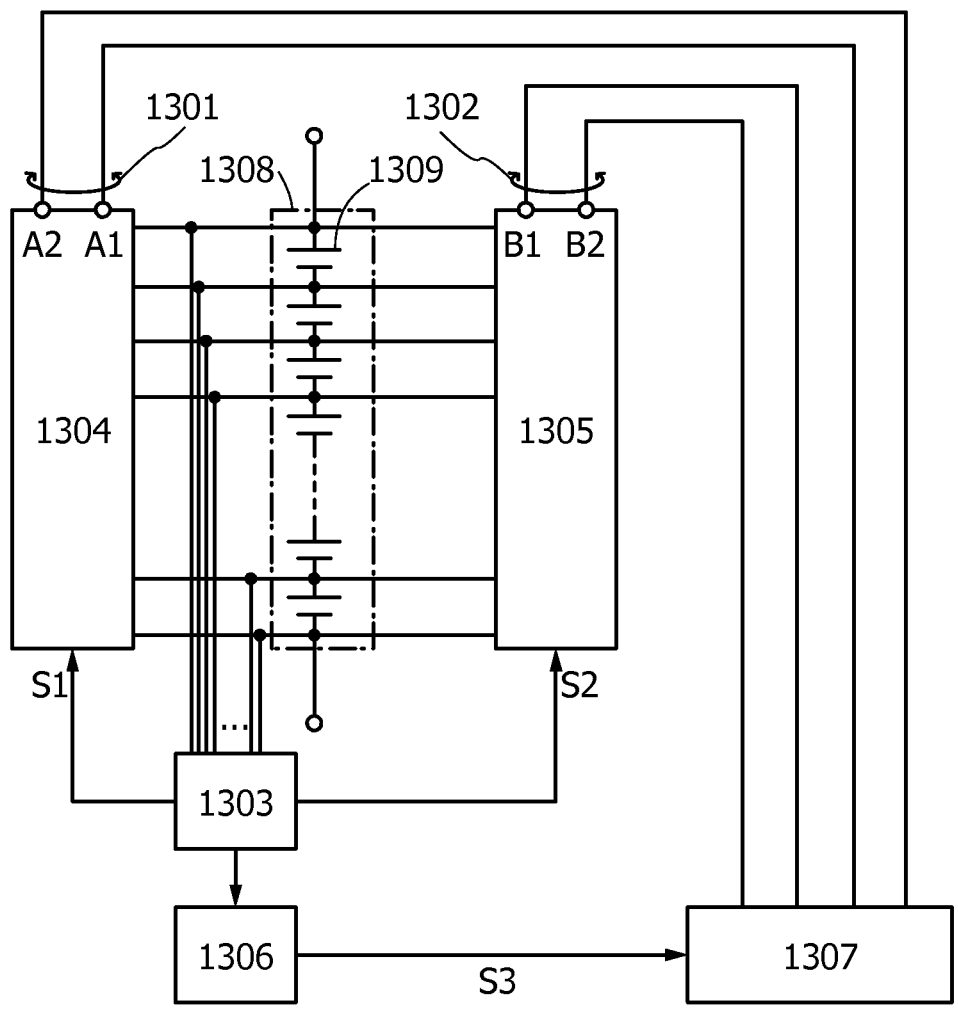

APPARATUS, SECONDARY BATTERY, ELECTRONIC DEVICE, AND BATTERY MANAGEMENT UNIT

BACKGROUND OF THE INVENTION

1. Field of the Invention

The present invention relates to an object, a method, or a manufacturing method. The present invention relates to a process, a machine, manufacture, or a composition of matter. One embodiment of the present invention relates to a semiconductor device, a display device, a light-emitting device, a power storage device, a driving method therefor, or a manufacturing method therefor. In particular, one embodiment of the present invention relates to a fabricating apparatus for a storage battery.

Note that electronic devices in this specification mean all devices which operate by being supplied with electric power, and electronic devices including power sources, electronic devices and electro-optical devices including power sources such as storage batteries, information terminal devices including storage batteries, vehicles including storage batteries, and the like are all electronic devices.

2. Description of the Related Art

In recent years, portable information terminals typified by smartphones have been actively developed. Portable information terminals, which are a kind of electronic devices, are desired to be lightweight and compact by users.

Patent Document 1 discloses an example of a hands-free wearable device with which information can be visually obtained anywhere, specifically, a goggle-type display device that includes a CPU and is capable of data communication. The device disclosed in Patent Document 1 is also a kind of electronic device.

Most wearable devices and portable information terminals include storage batteries (secondary batteries) that can be repeatedly charged and discharged and have problems in that, because of their lightness and compactness, the time for operation is limited. Secondary batteries used in wearable devices and portable information terminals should be lightweight and should be able to be used for a long time.

Examples of secondary batteries include a nickel-metal hydride battery and a lithium-ion secondary battery. In particular, lithium-ion secondary batteries have been actively researched and developed because the capacity thereof can be increased and the size thereof can be reduced.

Electrodes serving as positive electrodes or negative electrodes of lithium-ion secondary batteries are each formed using, for example, metal lithium, a carbon-based material, or an alloy-based material. Lithium-ion secondary batteries are divided into lithium metal batteries, lithium-ion secondary batteries, and lithium polymer secondary batteries according to the kind of electrolyte. Furthermore, batteries are divided into thin (laminated) batteries, cylindrical batteries, coin-type batteries, and rectangular batteries according to the kind of an exterior material in which electrodes and an electrolyte are packed.

REFERENCE

Patent Document

[Patent Document 1] Japanese Published Patent Application No. 2005-157317

SUMMARY OF THE INVENTION

A lithium-ion secondary battery using an electrolyte solution is fabricated by surrounding a positive electrode (e.g., a lithium-containing oxide material), a negative electrode (e.g., carbon), and another member with an exterior material, introducing the electrolyte solution in a surrounded region, and sealing the exterior material. After that, the fabricated lithium-ion secondary battery is subjected to the first charge. Alternatively, before sealing, the first charge is performed.

In the first charge, which is also called the initial charge, a chemical reaction might occur at a surface of an electrode and/or a surface of an electrolyte solution, generating a gas. Furthermore, lithium ions released from a lithium-containing oxide material are transferred to and inserted into a negative electrode. When lithium reacts with carbon in the negative electrode at this time, a thin film of $Li_2O$ or the like is formed on a surface of carbon. This thin film might affect the transfer of lithium ions and the like, leading to a change in the characteristics of a battery.

Not only in the initial charge, but whenever a gas is generated in a secondary battery, a sealed region expands and thus the secondary battery expands, which might degrade the characteristics of the battery.

An object of one embodiment of the present invention is to provide a fabricating method and a fabricating apparatus for a lithium-ion secondary battery having stable charge characteristics and lifetime characteristics.

An object of one embodiment of the present invention is to provide a novel power storage device, a novel secondary battery, or the like.

Note that the descriptions of these objects do not disturb the existence of other objects. In one embodiment of the present invention, there is no need to achieve all the objects. Other objects will be apparent from and can be derived from the descriptions of the specification, the drawings, the claims, and the like.

In view of the above, during fabrication of a secondary battery, a positive electrode is subjected to an electrochemical reaction in an abundance of electrolyte solution to sufficiently form a reaction product in advance, typically generate a gas. Then, the secondary battery is fabricated using the reacted positive electrode.

A positive electrode is subjected to an electrochemical reaction in a large amount of electrolyte solution in advance before a secondary battery is completed. In this manner, the positive electrode can have stability. The use of the positive electrode enables fabrication of a highly reliable secondary battery. The initial charge also changes part of the quality of the large amount of electrolyte solution. Not this large amount of electrolyte solution containing the reaction product but a small amount of electrolyte solution prepared separately is used in fabricating a secondary battery. The positive electrode subjected to the initial charge is unlikely to react with the small amount of electrolyte solution and hardly form a reaction product.

Like the positive electrode, a negative electrode is subjected to an electrochemical reaction in an electrolyte solution before the secondary battery is completed, whereby the negative electrode can have stability.

A fabricating apparatus for a secondary battery disclosed in this specification includes a container, an outlet and an electrolyte solution in the container, a first electrode for an electrochemical reaction in the electrolyte solution, a first cord electrically connected to the first electrode, and a second cord electrically connected to a second electrode including an active material layer. The first cord and the second cord are electrically connected to a device for controlling reduction conditions or oxidation conditions.

In one embodiment of the present invention, the second electrode has a positive electrode active material layer or a negative electrode active material layer on its surface.

In one embodiment of the present invention, the container has a function of storing an electrolyte solution.

In one embodiment of the present invention, the outlet has a function of supplying a gas into the container.

In one embodiment of the present invention, the fabricating apparatus includes a pump to generate bubbles of an inert gas into the container from the outlet.

In one embodiment of the present invention, the inert gas is an argon gas.

In one embodiment of the present invention, the fabricating apparatus includes a control device having a function of controlling the amount of the inert gas supplied.

In one embodiment of the present invention, to shorten treatment time by promotion of an electrochemical reaction (oxidation or reduction), a means for heating the electrolyte solution in the container (e.g., a heater) may be provided.

In one embodiment of the present invention, the fabricating apparatus further includes an exhaust means for exhausting a gas in the container. As the exhaust means, a fan is preferably used to exhausts a gas from the hermetically-closed apparatus. For example, the hermetically-closed apparatus is maintained at a pressure of approximately 0.5 atmospheres.

Alternatively, a batch-type apparatus may be employed to perform treatment on a plurality of electrodes. In that case, the fabricating apparatus includes a plurality of second cords that is electrically connected to the second electrode, so that a plurality of second electrodes are subjected to reduction or oxidation at a time in the electrolyte solution.

A cover which can prevent the argon bubbles from diffusing to outside the electrode may be provided around the electrode. Here, the electrode may be provided so as to fit in the cover.

A fabricating method for a secondary battery using an electrode formed with the above fabricating apparatus for one or both of electrodes is also one embodiment of the present invention. The fabricating method for a secondary battery includes the steps of forming a first electrode including a positive electrode active material layer; forming a second electrode including a negative electrode active material layer; performing electrochemical reduction or oxidation on the first electrode or the second electrode put in an electrolyte solution in a container by supplying a current in the electrolyte solution with the electrode used as one electrode; taking out the first electrode or second electrode that has been subjected to the electrochemical reaction from the electrolyte solution in the container; drying and processing the first electrode or the second electrode into a desired shape; packing a stack formed of the first electrode and the second electrode in a region surrounded by an exterior body having an opening; introducing the electrolyte solution in the region surrounded by the exterior body; and closing the opening of the exterior body.

In the above fabricating method, the electrolyte solution contains lithium, and the electrode subjected to the electrochemical reaction is lithium foil.

A fabricating apparatus for a secondary battery disclosed in this specification includes a container, a heating means, and a cooler. The container has a function of storing an electrolyte solution. The heating means has a function of heating the electrolyte solution. The cooler has a function of cooling and condensing vaporized solvent components of the electrolyte solution, and dripping the components to the electrolyte solution.

A fabricating apparatus for a secondary battery disclosed in this specification includes a container, a heating means, and a cooler. The container has a function of holding a first electrode and a second electrode, and a function of storing an electrolyte solution. The heating means has a function of heating the electrolyte solution. The cooler has a function of cooling and condensing vaporized solvent components of the electrolyte solution, and dripping the components to the electrolyte solution. The cooler and the second electrode are electrically connected to each other.

A fabricating apparatus for a secondary battery disclosed in this specification includes a container, a heating means, a cooler, a pipe, a refrigerant, and a control device. The container has a function of holding a first electrode and a second electrode, and a function of storing an electrolyte solution. The heating means has a function of heating the electrolyte solution. The cooler has a function of cooling and condensing vaporized solvent components of the electrolyte solution, and dripping the components to the electrolyte solution. The cooler and the control device are connected to each other with the pipe to form a circuit. Heat is exchanged by circulating the refrigerant in the circuit with the control device.

One of the first electrode and the second electrode includes an active material layer.

The cooler is hollow.

A secondary battery is fabricated using one of the apparatuses.

An electronic device includes the secondary battery, and any of an antenna, an operation switch, a microphone, and a speaker.

A battery management unit controls charge and discharge of the secondary battery.

One embodiment of the present invention can provide a secondary battery having a high electrode capacity, high-speed charge and discharge characteristics, and improved cycle performance.

One embodiment of the present invention can provide a fabricating apparatus and a fabricating method for a secondary battery having a small initial capacity loss. Furthermore, a lithium-ion battery that is fabricated with the fabricating apparatus has high cycle performance.

A fabricating method and a fabricating apparatus for a lithium-ion secondary battery having stable charge characteristics and lifetime characteristics can be provided.

With one embodiment of the present invention, a novel electrode, a novel secondary battery, or a novel power storage device can be provided.

Note that the description of the plurality of effects does not preclude the existence of other effects. In one embodiment of the present invention, there is no need to achieve all the effects described above. In one embodiment of the present invention, an object other than the above objects, an effect other than the above effects, and a novel feature will be apparent from the description of the specification and the drawings.

BRIEF DESCRIPTION OF THE DRAWINGS

FIGS. 8A to 8F illustrate fabricating steps of a thin secondary battery of one embodiment of the present invention;

FIGS. 11A1, 11A2, 11B1, and 11B2 each illustrate an example of a power storage system.

FIG. 17 is a block diagram showing one embodiment of the present invention;

DETAILED DESCRIPTION OF THE INVENTION

Figure 1:
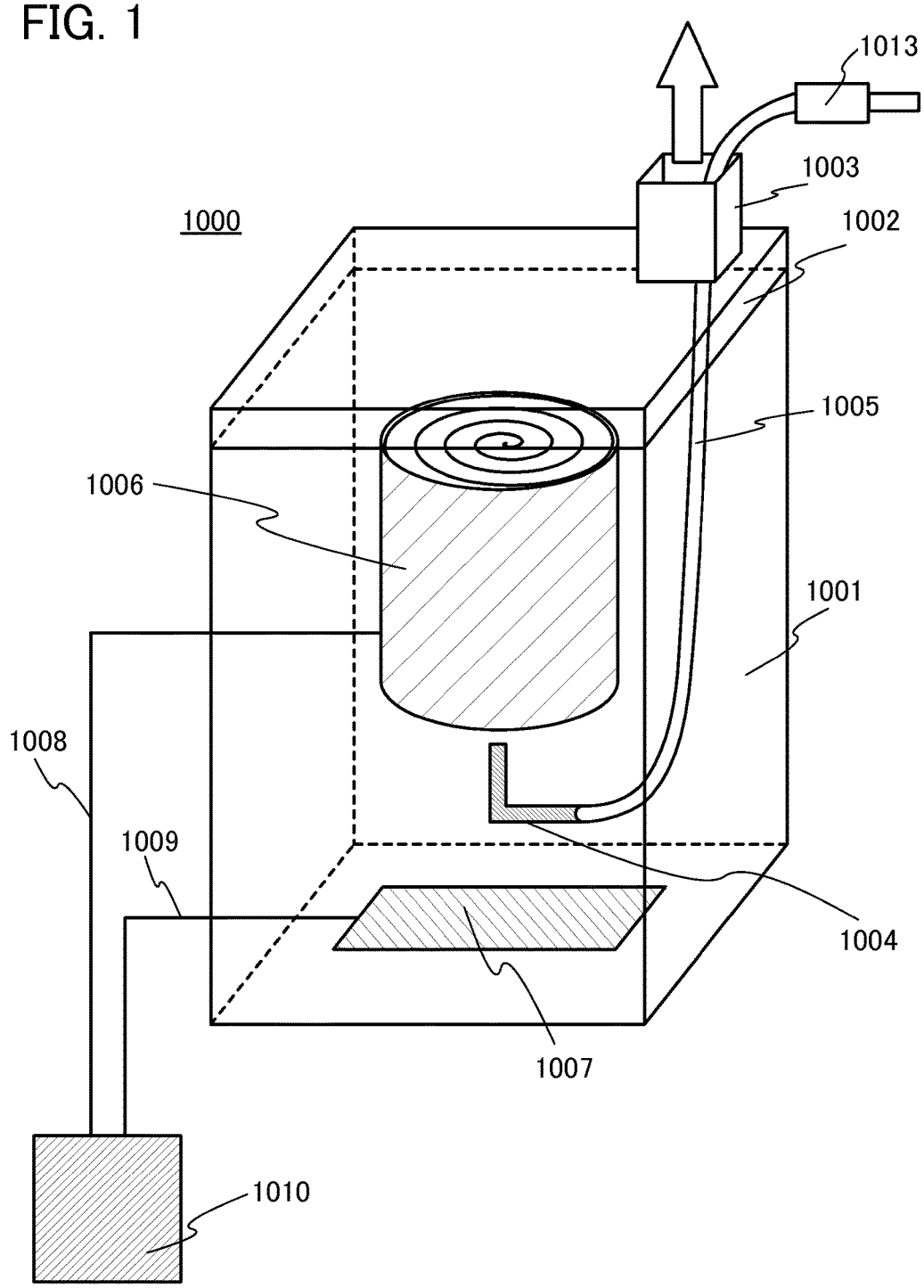
FIG. 1 is a schematic view of a fabricating apparatus of one embodiment of the present invention.

Embodiments and examples of the present invention will be described below in detail with reference to the drawings. However, the present invention is not limited to the descriptions below, and it is easily understood by those skilled in the art that modes and details disclosed herein can be modified in various ways. Further, the present invention is not construed as being limited to the descriptions of the embodiments and the examples.

The term "electrically connected" includes the case where components are connected through an "object having any electric function". There is no particular limitation on the "object having any electric function" as long as electric signals can be transmitted and received between the components connected through the object. Accordingly, even when the expression "electrically connected" is used in this specification, there is a case in which no physical connection is made and a wiring is just extended in an actual circuit.

The position, size, range, or the like of each component illustrated in drawings and the like is not accurately represented in some cases for easy understanding. Therefore, the disclosed invention is not necessarily limited to the position, the size, the range, or the like disclosed in the drawings and the like. In addition, some components might not be illustrated for easy understanding.

Ordinal numbers such as "first", "second", and "third" in this specification and the like are used to avoid confusion among components and do not indicate the priority or the order such as the order of steps or the stacking order. A term without an ordinal number in this specification and the like might be provided with an ordinal number in a claim in order to avoid confusion among components. In addition, a term with an ordinal number in this specification and the like might be provided with a different ordinal number in a claim. Moreover, a term with an ordinal number in this specification and the like might not be provided with any ordinal number in a claim.

Note that in all drawings used to illustrate the embodiments, portions that are identical or portion having similar functions are denoted by the same reference numerals, and their repetitive description may be omitted.

Embodiment 1

In this embodiment, a fabricating method and a fabricating apparatus for an electrode for a secondary battery of one embodiment of the present invention will be described with reference to FIG. 1, FIG. 2, FIG. 3, FIG. 4, and FIGS. 8A to 8E.

FIG. 8A is a perspective view of an exterior body 11 of a secondary battery 40. FIG. 8B is a perspective view of a positive electrode, a separator, and a negative electrode, which are stacked. FIG. 8C is a lead electrode 16 for leading the positive electrode and the negative electrode to the outside of the exterior body. The lead electrode 16 includes the sealing layer 15. FIG. 8D is a perspective view of a secondary battery 40. FIG. 8E is an example of a cross section of the secondary battery 40 taken along dashed-dotted line A-B in FIG. 8D. FIG. 8F is a diagram illustrating a current flow in charging the secondary battery 40.

A sheet made of a flexible base material is prepared as the exterior body 11. As the sheet, a stacked body, a metal film provided with an adhesive layer (also referred to as a heat-seal layer) or sandwiched between adhesive layers is used. As the adhesive layer, a heat-seal resin film containing, e.g., polypropylene or polyethylene is used. In this embodiment, a metal sheet, specifically, aluminum foil one surface of which is provided with a nylon resin and the other surface of which is provided with a stack including an acid-resistant polypropylene film and a polypropylene film is used as the sheet. FIG. 8A shows the sheet which is cut and folded in half.

The positive electrode includes at least a positive electrode current collector 12 and a positive electrode active material layer 18. The negative electrode includes at least a negative electrode current collector 14 and a negative electrode active material layer 19. Although the storage battery electrode (positive electrode or negative electrode) in the shape of a rectangular sheet is illustrated in FIG. 8B, the shape of the storage battery electrode is not limited thereto and may be any appropriate shape. An active material layer is formed over only one surface of a current collector; however, active material layers may be formed on both surfaces of a current collector. The active material layer is not necessarily formed over an entire surface of the current collector, and a region where an active material layer is not formed such as a region for connection with an electrode tab is provided as appropriate.

There is no particular limitation on the current collector used in a positive electrode or a negative electrode as long as it has high conductivity without causing a significant chemical change in the secondary battery. For example, the current collector can be formed using a metal such as gold, platinum, iron, nickel, copper, aluminum, titanium, tantalum, or manganese, or an alloy thereof (e.g., stainless steel). Furthermore, coating with carbon, nickel, titanium, or the like may be performed. Silicon, neodymium, scandium, molybdenum, or the like may be added to improve heat resistance. The current collector can each have any of various shapes including a foil-like shape, a sheet-like shape, a plate-like shape, a net-like shape, a cylindrical shape, a coil shape, a punching-metal shape, an expanded-metal shape, a porous shape, and a shape of non-woven fabric as appropriate. The current collector may be formed to have micro irregularities on the surface thereof in order to enhance adhesion to the active material. The current collector preferably has a thickness of more than or equal to 5 μm and less than or equal to 30 μm.

As the active material used in the positive electrode or the negative electrode, a material into and from which carrier ions, such as lithium ions, can be inserted and extracted is used. The average diameter or diameter distribution of the active material particles can be controlled by crushing, granulation, and classification by an appropriate means.

Examples of positive electrode active materials that can be used for the positive electrode active material layer 18 include a composite oxide with an olivine structure, a composite oxide with a layered rock-salt structure, and a composite oxide with a spinel structure. As the positive electrode active material, a compound such as $LiFeO_2$, $LiCoO_2$, $LiNiO_2$, $LiMn_2O_4$, $V_2O_5$, $Cr_2O_5$, and $MnO_2$ can be used.

Alternatively, a complex material ($LiMPO_4$ (general formula) (M is one or more of Fe(II), Mn(II), Co(II), and Ni(II))) can be used. Typical examples of the general formula $LiMPO_4$ which can be used as a material are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

Alternatively, a complex material such as $Li_{(2-j)}MSiO_4$ (general formula) (M is one or more of Fe(II), Mn(II), Co(II), and Ni(II); 0≤j≤2) may be used. Typical examples of the general formula $Li_{(2-j)}MSiO_4$ which can be used as a material are lithium compounds such as $Li_{(2-j)}FeSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Still alternatively, a nasicon compound expressed by $A_xM_2(XO_4)_3$ (general formula) (A=Li, Na, or Mg, M=Fe, Mn, Ti, V, Nb, or Al, X=S, P, Mo, W, As, or Si) can be used for the positive electrode active material. Examples of the nasicon compound are $Fe_2(MnO_4)_3$, $Fe_2(SO_4)_3$, and $Li_3Fe_2(PO_4)_3$. Further alternatively, for example, a compound expressed by $Li_2MPO_4F$, $Li_2MP_2O_7$, or $Li_5MO_4$ (general formula) (M=Fe or Mn), a perovskite fluoride such as $NaF_3$ and $FeF_3$, a metal chalcogenide (a sulfide, a selenide, or a telluride) such as $TiS_2$ and $MoS_2$, an oxide with an inverse spinel structure such as $LiMVO_4$, a vanadium oxide ($V_2O_5$, $V_6O_{13}$, $LiV_3O_8$, or the like), a manganese oxide, or an organic sulfur compound can be used as the positive electrode active material.

In the case where carrier ions are alkali metal ions other than lithium ions, or alkaline-earth metal ions, a material containing an alkali metal (e.g., sodium and potassium) or an alkaline-earth metal (e.g., calcium, strontium, barium, beryllium, and magnesium) instead of lithium may be used as the positive electrode active material.

As the separator 13, an insulator such as cellulose (paper), polypropylene with pores, and polyethylene with pores can be used.

As an electrolyte of an electrolyte solution 20, a material in which carrier ions can be transferred is used. A solute of the electrolyte solution 20 contains lithium ions which are carrier ions. Typical examples of the electrolyte are lithium salts such as $LiPF_6$, $LiClO_4$, $LiAsF_6$, $LiBF_4$, $LiCF_3SO_3$, $Li(CF_3SO_2)_2N$, and $Li(C_2F_5SO_2)_2N$. One of these electrolytes may be used alone, or two or more of them may be used in an appropriate combination and in an appropriate ratio.

As a solvent of the electrolyte solution, a material in which carrier ions can be transferred is used. As the solvent of the electrolyte solution, an aprotic organic solvent is preferably used. Typical examples of aprotic organic solvents include ethylene carbonate (EC), propylene carbonate, dimethyl carbonate, diethyl carbonate (DEC), γ-butyrolactone, acetonitrile, dimethoxyethane, tetrahydrofuran, and the like, and one or more of these materials can be used. When a gelled high-molecular material is used as the solvent of the electrolyte solution, safety against liquid leakage and the like is improved. Furthermore, the storage battery can be thinner and more lightweight. Typical examples of gelled high-molecular materials include a silicone gel, an acrylic gel, an acrylonitrile gel, a polyethylene oxide gel, a polypropylene oxide gel, a fluorine-based polymer gel, and the like. Alternatively, the use of one or more kinds of ionic liquids (room temperature molten salts) which have features of non-flammability and non-volatility as a solvent of the electrolyte solution can prevent the storage battery from exploding or catching fire even when the storage battery internally shorts out or the internal temperature increases owing to overcharging and others. An ionic liquid is a salt in the fluid state and has high ion mobility (conductivity). An ionic liquid contains a cation and an anion. Examples of ionic liquids include an ionic liquid containing an ethylmethylimidazolium (EMI) cation and an ionic liquid containing an N-methyl-N-propylpiperidinium ($PP_{13}$) cation.

Instead of the electrolyte solution, a solid electrolyte including an inorganic material such as a sulfide-based inorganic material or an oxide-based inorganic material, or a solid electrolyte including a macromolecular material such as a polyethylene oxide (PEO)-based macromolecular material may alternatively be used. In the case of using the solid electrolyte, a separator or a spacer is not necessary. Further, the battery can be entirely solidified; therefore, there is no possibility of liquid leakage and thus the safety of the battery is dramatically increased.

A material with which lithium can be dissolved and precipitated or a material into and from which lithium ions can be inserted and extracted can be used for a negative electrode active material of the negative electrode active material layer 19; for example, a lithium metal, a carbon-based material, an alloy-based material, or the like can be used.

The lithium metal is preferable because of its low redox potential (3.045 V lower than that of a standard hydrogen electrode) and high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (0.1 V to 0.3 V vs. Li/Li$^+$) when lithium ions are intercalated into the graphite (while a lithium-graphite intercalation compound is formed). For this reason, a lithium-ion secondary battery can have a high operating voltage. In addition, graphite is preferable because of its advantages such as relatively high capacity per unit volume, small volume expansion, low cost, and safety greater than that of a lithium metal.

For the negative electrode active material, a compound material which enables charge-discharge reactions by an alloying reaction and a dealloying reaction with lithium can be used. In the case where carrier ions are lithium ions, a material containing at least one of Si, Al, Ge, Sn, Pb, Sb, Bi, Ag, Au, Zn, Cd, In, Ga, and the like can be used as the compound material, for example. Such elements have higher capacity than carbon. In particular, silicon has a significantly high theoretical capacity of 4200 mAh/g. For this reason, silicon is preferably used as the negative electrode active material. Examples of the material using such elements include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like. Note that SiO refers to the powder of a silicon oxide including a silicon-rich portion and can also be referred to as $SiO_y$, (2>y>0). Examples of SiO include a material containing one or more of $Si_2O_3$, $Si_3O_4$, and $Si_2O$ and a mixture of Si powder and silicon dioxide ($SiO_2$). Furthermore, SiO may contain another element (e.g., carbon, nitrogen, iron, aluminum, copper, titanium, calcium, and manganese). In other words, SiO refers to a colored material containing two or more of single crystal silicon, amorphous silicon, polycrystal silicon, $Si_2O_3$, $Si_3O_4$, $Si_2O$, and $SiO_2$. Thus, SiO can be distinguished from $SiO_x$ (x is 2 or more), which is clear and colorless or white. Note that in the case where a secondary battery is fabricated using SiO as a material thereof and the SiO is oxidized because of repeated charge and discharge cycles, SiO is changed into $SiO_2$ in some cases.

Alternatively, as the negative electrode active material, an oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the negative electrode active materials, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active materials and thus the negative electrode active materials can be used in combination with a material for a positive electrode active material that does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material that causes a conversion reaction can be used for the negative electrode active materials; for example, a transition metal oxide that does not cause an alloy reaction with lithium, such as cobalt oxide (CoO), nickel oxide (NiO), and iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as a positive electrode active material because of its high potential.

The negative electrode active material layer 19 may further include a binder for increasing adhesion of active materials, a conductive additive for increasing the conductivity of the negative electrode active material layer 19, and the like in addition to the above negative electrode active materials.

In the secondary battery, for example, the separator 13 has a thickness of approximately 25 μm, the positive electrode current collector 12 has a thickness of approximately 20 μm to 40 μm, the positive electrode active material layer 18 has a thickness of approximately 100 μm, the negative electrode active material layer 19 has a thickness of approximately 100 μm, and the negative electrode current collector 14 has a thickness of approximately 20 μm to 40 μm.

FIG. 1 is a schematic perspective view illustrating a fabricating apparatus 1000. The fabricating apparatus 1000 includes a container 1001, a lid 1002, an exhaust port 1003, an outlet 1004, a pipe 1005, an electrode 1006, an electrode 1007, a first cord 1008, a second cord 1009, a control device 1010, and a control device 1013.

First, an electrolyte solution is introduced into the container 1001 in the fabricating apparatus 1000 illustrated in FIG. 1. A material with low volatility is preferably used as an electrolyte solution introduced into the container 1001. An electrolyte solution used in a secondary battery is preferably different from that introduced into the container 1001. As the electrolyte solution used in the secondary battery, a material with which a highly stable film is deposited on a negative electrode is used. The film is a passivation film called a solid electrolyte interface (SEI), which is effective in suppressing decomposition of an electrolyte solution. Ethylene carbonate (EC) is suitable for the solvent of the electrolyte solution of the secondary battery because the SEI can be formed easily. Note that as the electrolyte solution used in the container 1001, a material substantially the same as that to be used in the secondary battery may be used. In addition, a current collector (sheet-like electrode) of which one surface or both surfaces is/are provided with an active material layer (layers) is prepared, the lid 1002 is opened, and the sheet-like electrode that is rolled is put in the electrolyte solution in the container 1001 in the fabricating apparatus.

As an electrolyte of the electrolyte solution, a material in which carrier ions can be transferred is used. A solute of the electrolyte solution contains lithium ions which are carrier ions. Typical examples of the electrolyte are lithium salts such as $LiPF_6$, $LiClO_4$, $LiAsF_6$, $LiBF_4$, $LiCF_3SO_3$, $Li(CF_3SO_2)_2N$, and $Li(C_2F_5SO_2)_2N$. One of these electrolytes may be used alone or two or more of them may be used in an appropriate combination and in an appropriate ratio.

As a solvent of the electrolyte solution, a material in which carrier ions can be transferred is used. As the solvent of the electrolyte solution, an aprotic organic solvent is preferably used. Typical examples of aprotic organic solvents include ethylene carbonate (EC), propylene carbonate, dimethyl carbonate, diethyl carbonate (DEC), γ-butyrolactone, acetonitrile, dimethoxyethane, tetrahydrofuran, and the like, and one or more of these materials can be used.

The put current collector (the electrode 1006) is electrically connected via a holding means (e.g., a conductive fastener). The holding means is electrically connected to the control device 1010 via the first cord 1008.

In FIG. 1, the outlet 1004 is provided for promoting an electrochemical reaction (oxidation or reduction) for shortening of treatment time. A gas is transferred into the electrolyte solution through the pipe 1005 with a pump, and the electrolyte solution is made to flow by the bubbles released from the outlet 1004. In the case of using a gas, a certain distance is set between facing surfaces of the rolled electrode to facilitate release of gas components (gases on a surface of the electrode or bubbles in the electrolytic solution) such as oxygen gas generated from the electrode, from the electrolytic solution.

In the case where the electrode is rolled up as shown in FIG. 1, the bottom of the electrode is positioned directly above the outlet so that bubbles can enter between facing surfaces of the rolled electrode, which promotes the flow of the electrolyte solution.

The outlet 1004 can be formed using a metal. For a metal for forming the outlet 1004, a metal having a corrosion-resistant property, such as nickel, aluminum, titanium, an alloy of such metals, and an alloy of such a metal and another metal (e.g., stainless steel) can be used. In the case where a metal material having a low corrosion-resistant property is used, the outlet 1004 is preferably covered with nickel, aluminum, or the like in order to prevent corrosion by the electrolyte solution. In addition to a metal, a material having a corrosion-resistant property to the electrolyte solution such as resin, glass, or ceramics may be used.

As a gas, an inert gas such as argon, nitrogen, or carbon dioxide can be used.

The control device 1013 controls the amount of gas supplied from the outlet. A mass flow controller can be used as the control device 1013.

The control device 1010 has at least two cord wirings. One of the cord wirings (the first cord 1008) is electrically connected to the current collector via the holding means, and the other cord wiring (the second cord 1009) is electrically connected to metal foil or a metal plate. In this embodiment, lithium foil used as the electrode 1007 and electrically connected to the other cord wiring is also put in the electrolyte solution in the container. Alternatively, a platinum electrode may be used instead of lithium foil as the electrode 1007. Still alternatively, a high-potential negative electrode of $FePO_4$, LTO, or the like that is predoped with lithium can be used as the electrode 1007.

The electrolyte solution is provided between the two cord wirings of the control device 1010. The control device 1010 adjusts the amount of current and voltage that are supplied and applied to the electrolyte solution provided between the two cord wirings, and the like to perform oxidation or reduction on the active material layer placed in the electrolyte solution.

Figure 2:
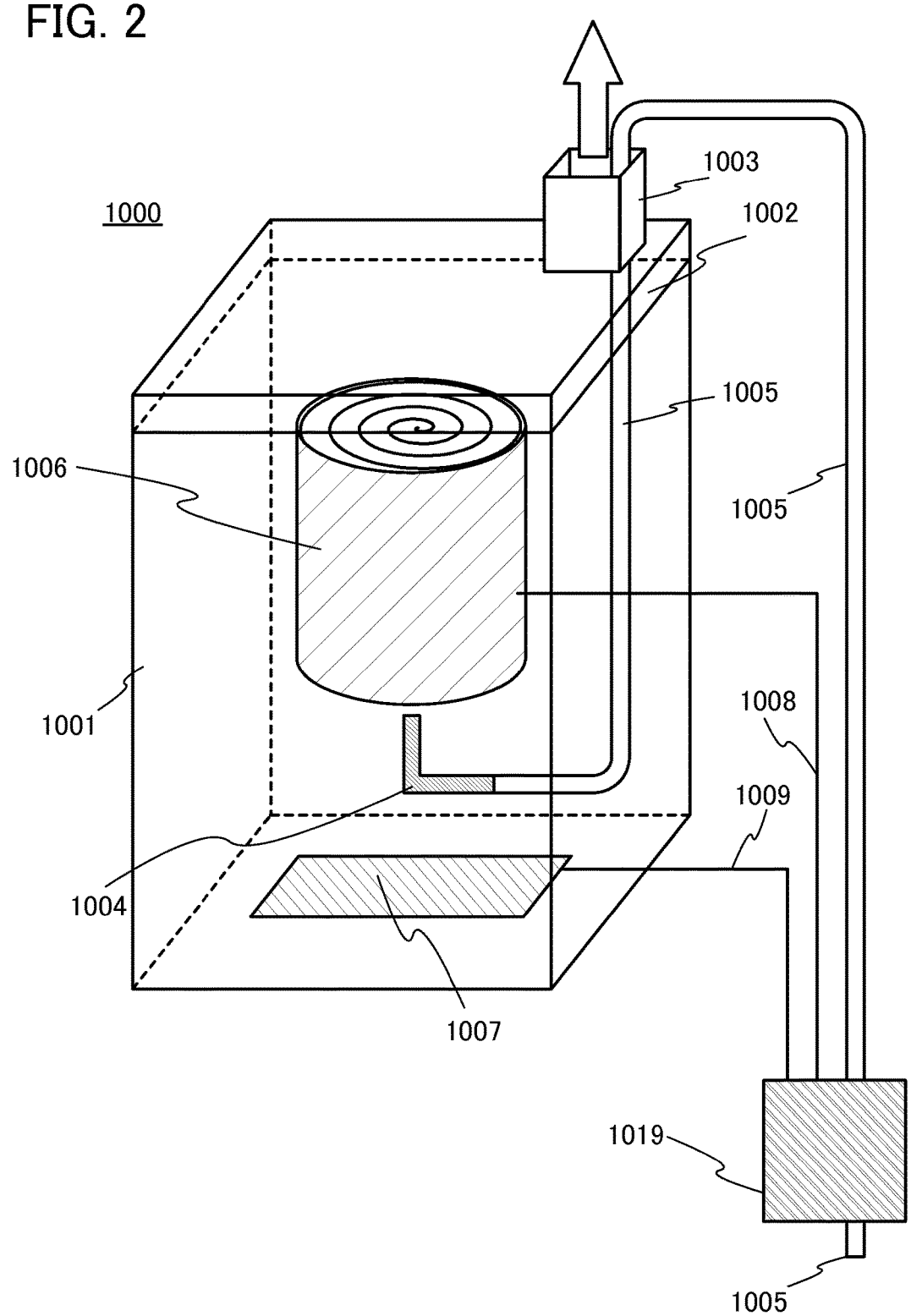
FIG. 2 is a schematic view of a fabricating apparatus of one embodiment of the present invention.

The control device 1010 and the control device 1013 may be separated from each other as shown in FIG. 1. Alternatively, one control device serving as the control device 1010 and the control device 1013 may be used. FIG. 2 illustrates an example of a control device 1019 having the function of the control device 1010 and the function of the control device 1013.

An electrochemical reaction (oxidation or reduction) is caused while the flow of the electrolyte solution is produced. After the occurrence of the electrochemical reaction, the electrode 1006 is taken out from the electrolyte solution in the container. The electrode 1006 is dried and processed into a desired shape. A stack formed of a positive electrode, a separator, and a negative electrode is packed in a region surrounded by an exterior body having an opening, the electrolyte solution is introduced into the region surrounded by the exterior body, and the opening of the exterior body is closed by thermocompression bonding. A thermocompression-bonded region 17 is illustrated in FIGS. 8D and 8E. In this manner, the secondary battery illustrated in FIG. 8E can be manufactured.

Here, a current flow in charging the secondary battery will be described with reference to FIG. 8F. When a secondary battery using lithium is regarded as a closed circuit, lithium ions transfer and a current flows in the same direction. Note that in the secondary battery using lithium, an anode and a cathode change places in charge and discharge, and an oxidation reaction and a reduction reaction occur on the corresponding sides; hence, an electrode with a high redox potential is called a positive electrode and an electrode with a low redox potential is called a negative electrode. For this reason, in this specification, the positive electrode is referred to as a "positive electrode" and the negative electrode is referred to as a "negative electrode" in all the cases where charge is performed, discharge is performed, a reverse pulse current is supplied, and a charging current is supplied. The use of the terms "anode" and "cathode" related to an oxidation reaction and a reduction reaction might cause confusion because the anode and the cathode change places at the time of charging and discharging. Thus, the terms "anode" and "cathode" are not used in this specification. If the term "anode" or "cathode" is used, whether it is at the time of charging or discharging is noted and whether it corresponds to a positive electrode or a negative electrode is also noted.

Two terminals in FIG. 8F are connected to a charger, and the secondary battery 40 is charged. As the charge of the secondary battery 40 proceeds, a potential difference between electrodes increases. The positive direction in FIG. 8F is the direction in which a current flows from one terminal outside the secondary battery 40 to the positive electrode current collector 12, flows from the positive electrode current collector 12 to the negative electrode current collector 14 in the secondary battery 40, and flows from the negative electrode to the other terminal outside the secondary battery 40. In other words, a current flows in the direction of a flow of a charging current.

Although an example of a small battery used in a portable information terminal or the like is described in this embodiment, one embodiment of the present invention is not particularly limited to this example. Application to a large battery provided in a vehicle or the like is also possible.

According to one embodiment of the present invention, the initial irreversible capacity of the positive electrode and the negative electrode can be reduced, and a secondary battery having a high electrode capacity, high-speed charge and discharge characteristics, and improved cycle performance can be provided.

In Embodiment 1, one embodiment of the present invention has been described. Other embodiments of the present invention are described in Embodiments 2 to 9. Note that one embodiment of the present invention is not limited thereto. In other words, various embodiments of the invention are described in this embodiment and the other embodiments, and one embodiment of the present invention is not limited to a particular embodiment. Although an example of application to a lithium-ion secondary battery is described in this embodiment, one embodiment of the present invention is not limited to this example. Depending on circumstances or conditions, one embodiment of the present invention can be applied to a variety of secondary batteries such as a lead storage battery, a lithium-ion polymer secondary battery, a nickel-hydrogen storage battery, a nickel-cadmium storage battery, a nickel-iron storage battery, a nickel-zinc storage battery, a silver oxide-zinc storage battery, a solid-state battery, and an air battery is also possible. Depending on circumstances or conditions, one embodiment of the present invention can be applied to a variety of power storage devices such as a primary battery, a capacitor, and a lithium-ion capacitor. Furthermore, depending on circumstances or conditions, one embodiment of the present invention is not necessarily applied to a lithium-ion secondary battery.

This embodiment can be implemented in an appropriate combination with any of the structures described in the other embodiments.

Embodiment 2

In this embodiment, an example of a fabricating apparatus which is different from that in Embodiment 1 is described. The example further includes a cover. Note that in FIG. 3 and FIG. 4, components that are the same as those in FIG. 1 described in Embodiment 1 are denoted by the common reference numerals.

Figure 3:
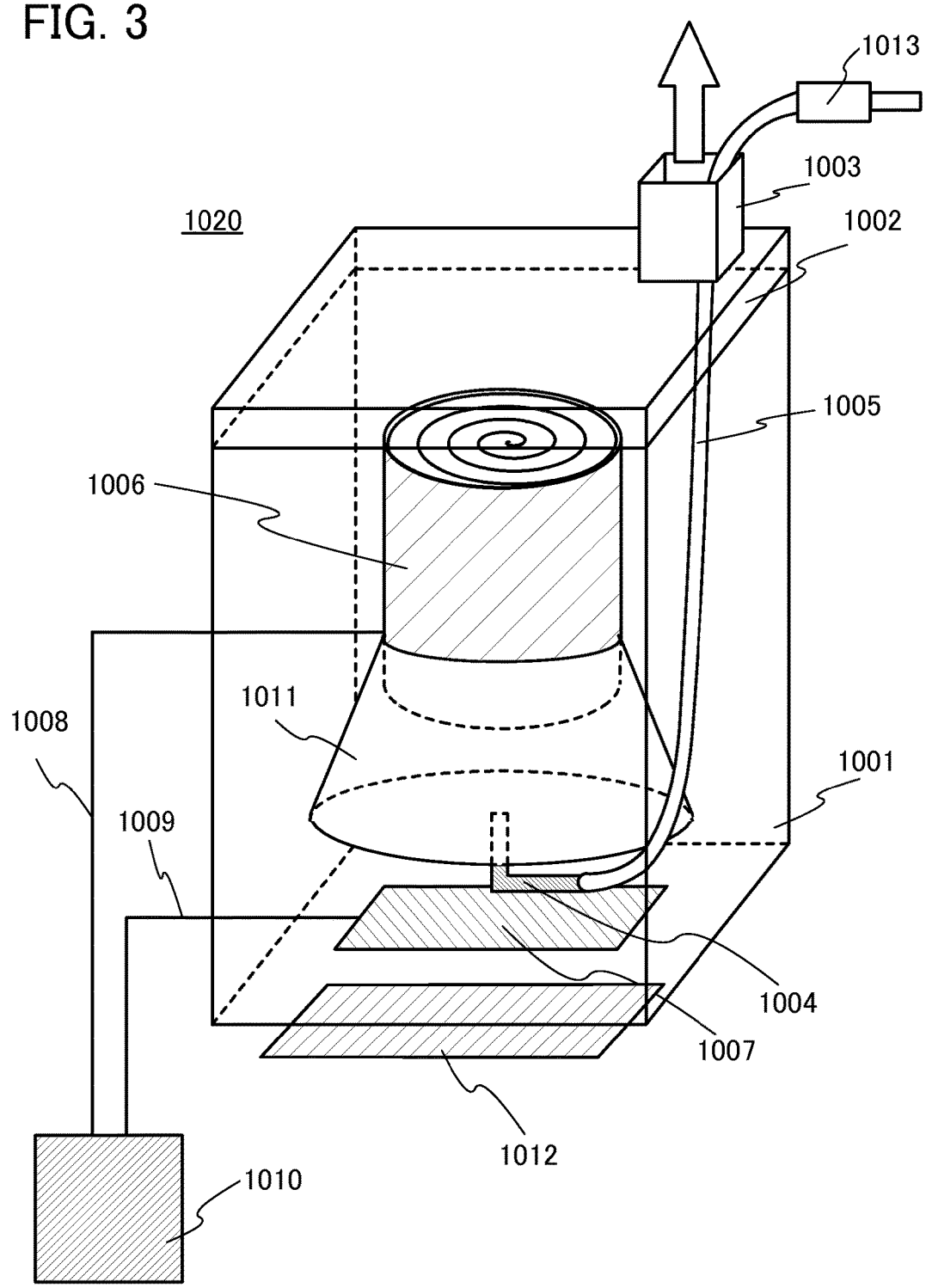
FIG. 3 is a schematic view of a fabricating apparatus of one embodiment of the present invention.

FIG. 3 is a schematic cross-sectional view illustrating a fabricating apparatus 1020. The fabricating apparatus 1020 includes the container 1001, the outlet 1004, the electrode 1006, the first cord 1008, the second cord 1009, the control device 1010, a cover 1011, a heating means 1012, and the control device 1013.

The cover 1011 is a hollow cylinder having openings on both sides. The openings on both sides may have the same diameter or different diameters as shown in FIG. 3.

An end portion of the rolled electrode is fit in one opening of the cover 1011, and the outlet 1004 of a gas is provided in the other opening. The cover 1011 may be fixed using a holding member (not illustrated) for fixing the electrode 1006 or the like in a predetermined position in the container. Alternatively, the cover 1011 can be used as the holding member for holding the electrode 1006. Here, it is preferable that the cover 1011 and the electrode 1006 are electrically insulated from each other.

The cover 1011 can be formed using a metal. For a metal for forming the cover 1011, a metal having a corrosion-resistant property, such as nickel, aluminum, titanium, an alloy of such metals, and an alloy of such a metal and another metal (e.g., stainless steel) can be used. In the case where a metal material having a low corrosion-resistant property is used, the cover 1011 is preferably covered with nickel, aluminum, or the like in order to prevent corrosion by the electrolyte solution. In addition to a metal, a material having a corrosion-resistant property to the electrolyte solution such as resin, glass, or ceramics may be used.

Figure 4:
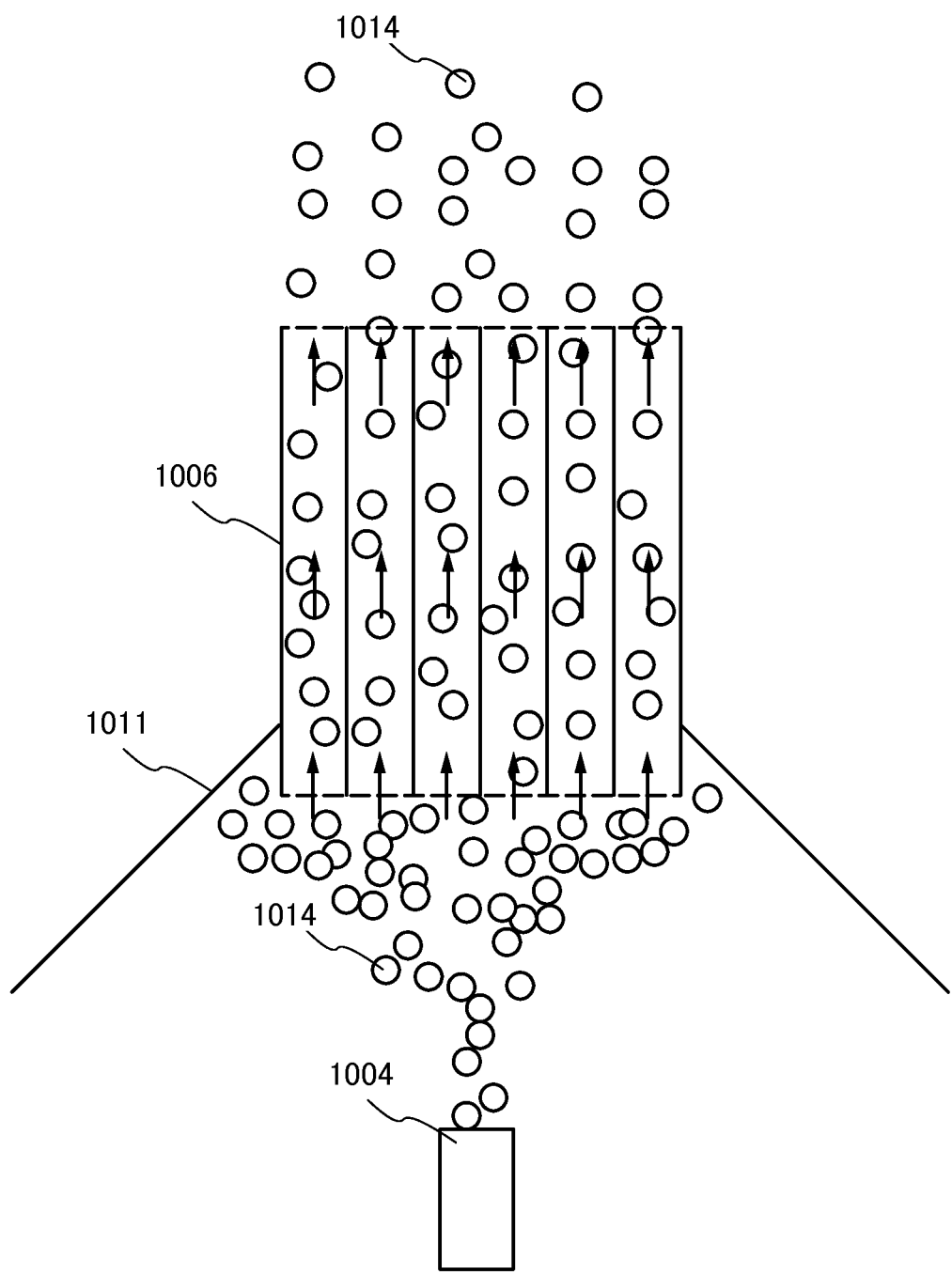
FIG. 4 is schematic cross-sectional view of a fabricating apparatus of one embodiment of the present invention.

FIG. 4 illustrates the movement of bubbles supplied from the outlet. The bubbles 1014 supplied from the outlet 1004 are gathered to the lower end of the rolled electrode 1006 with the cover 1011. Then, the bubbles pass through a space between facing surfaces of the rolled electrode 1006 and are released to the electrolyte solution from the upper end of the rolled electrode 1006. The electrolyte solution flows from the lower end to the top end of the rolled electrode 1006 as the bubbles moves. The arrows schematically show the flowing direction of the electrolyte solution.

By utilizing the cover, the range for positioning the outlet to the rolled current collector is widened. Thus, the bubbles are easily hit on the rolled electrode, and the electrolyte solution can flow more easily through the rolled electrode.

The fabricating apparatus 1020 is configured to cause an electrochemical reaction (oxidation or reduction) in a nitrogen atmosphere or an argon atmosphere.

In the case where a batch-type apparatus in which more than one electrode 1006 is put in the electrolyte solution to cause an electrochemical reaction is employed, a large container is used, and a set of the electrode 1007, the first cord 1008, the second cord 1009, the cover 1011, the outlet 1004, and the control device 1010 is prepared for each of the electrodes 1006. In that case, one electrolyte solution and one container can be used for the batch-type apparatus.

This embodiment can be freely combined with Embodiment 1. For example, the electrolyte solution is heated by the heating means 1012 while bubbles are generated by introducing an argon gas into the electrolyte solution. This can promote an electrochemical reaction, which enables short-time oxidation treatment and reduction treatment. The heating means 1012 may be provided inside the container. The heating means 1012 is provided outside the container in FIG. 3 though.

In the case where the above described positive electrode active material is used for improving characteristics of the secondary battery, the decomposition of the electrolyte solution is accelerated and the reaction product concentration is likely to be increased because the reaction potential of the electrode 1006 is a high potential. Note that the reaction potential here refers to the potential of the electrode 1007 as a standard. For example, the description "the reaction potential is a high potential" means that the reaction potential is higher than the potential of the electrode 1007.

In the case where a high capacitance material such as SiO is used as a negative electrode active material to improve the characteristics of the secondary battery, the reaction potential of the electrode 1006 is equivalent to the potential of the electrode 1007, so that the decomposition of the electrolyte solution is accelerated and the reaction product concentration is likely to be increased.

For this reason, it is preferable that the treatment time be short, and it is effective to increase the reactivity by heating the electrolyte solution with the heating means 1012.

This embodiment can be implemented in an appropriate combination with any of the structures described in the other embodiments.

Embodiment 3

In Embodiment 3, an example of a fabricating apparatus which is different from that in the above embodiments is described. Although the above embodiment shows the example where the electrolyte solution is heated to promote an electrochemical reaction, the ratio of components of the electrolyte solution may be varied due to volatilization of the electrolyte solution by heating. To prevent this variation, an example where a cooler is provided to prevent this problem is shown in Embodiment 3.

Figure 5:
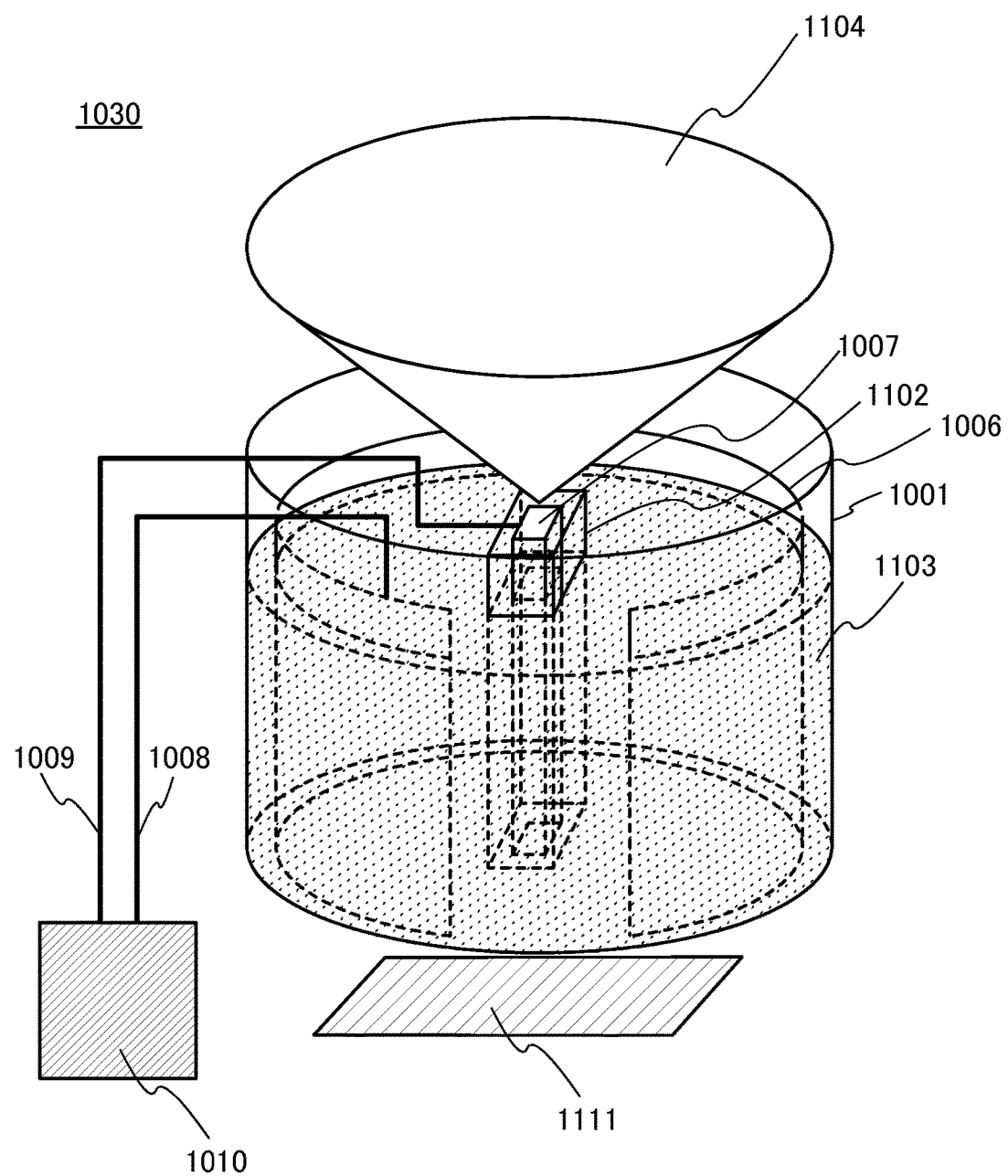
FIG. 5 is a schematic view of a fabricating apparatus of one embodiment of the present invention.

FIG. 5 is a schematic perspective view illustrating a fabricating apparatus 1030 in which a cooler is used. The fabricating apparatus 1030 includes the container 1001, a separator 1102, an electrolyte solution 1103, a cooler 1104, the electrode 1006, the electrode 1007, the first cord 1008, the second cord 1009, the control device 1010, and a heating means 1111.

The cooler 1104 can be formed using a metal. For a metal for forming the cooler 1104, a metal having a corrosion-resistant property, such as nickel, aluminum, titanium, an alloy of such metals, and an alloy of such a metal and another metal (e.g., stainless steel) can be used. In the case where a metal material having a low corrosion-resistant property is used, the cooler 1104 is preferably covered with nickel, aluminum, or the like in order to prevent corrosion by the electrolyte solution. In addition to a metal, a material having a corrosion-resistant property to the electrolyte solution such as resin, glass, or ceramics may be used.

Figure 6:
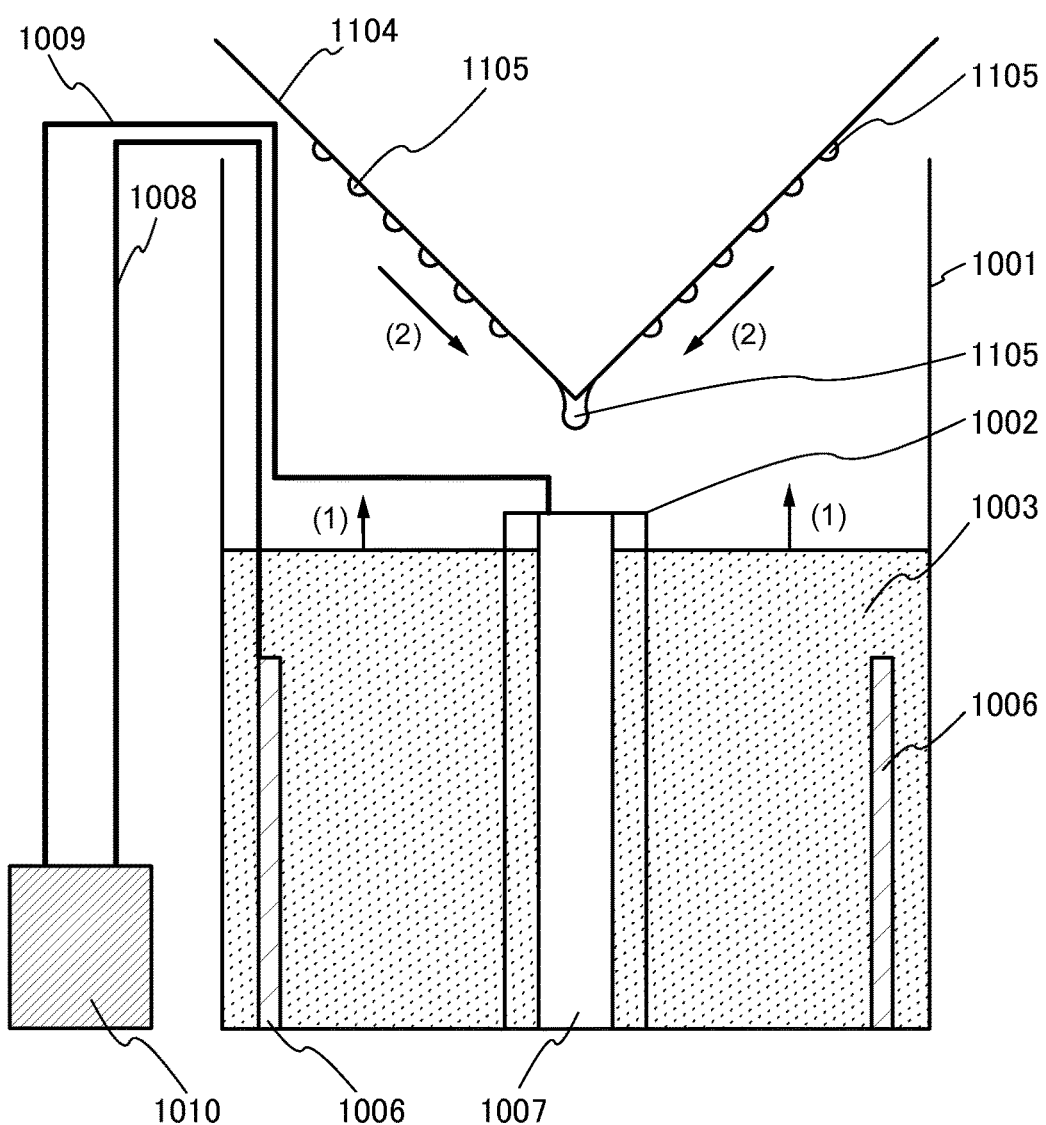
FIG. 6 is a schematic view of a fabricating apparatus of one embodiment of the present invention.

A method for cooling and condensing vaporized solvent components of the electrolyte solution and returning the components to the electrolyte solution by the cooler 1104 is shown with reference to FIG. 6. FIG. 6 schematically shows a central cross section of the fabricating apparatus 1030 illustrated in FIG. 5 and the movement of vaporized solvent components of the electrolyte solution. Solvent components (1) of the electrolyte solution are vaporized and attached to a surface of the cooler 1104. The solvent attached to the cooler 1104 is cooled and condensed to form droplets 1105 on the surface of the cooler. The droplets 1105 flow down along the surface of the cooler by gravity and are temporarily accumulated on the bottom of the cooler 1104 by surface tension. When the droplets 1105 accumulated on the bottom reach the quantity which cannot be supported by the surface tension at the surface of the cooler, the droplets 1105 drop to the electrolyte solution in the container 1001.

The vaporized solvent components of the electrolyte solution 1103 are continuously condensed by the cooler 1104 while an electrochemical reaction is performed. Since the vaporized solvent components of the electrolyte solution 1103 return to the electrolyte solution, the fluctuation of the components of the electrolyte solution can be suppressed. As a result, the electrochemical reaction can be stable.

Embodiment 4

In Embodiment 4, an example of a fabricating apparatus which is different from that in Embodiment 3 is described. In comparison to Embodiment 3, the temperature of the cooler 1113 in Embodiment 4 can be controlled.

Figure 7A:
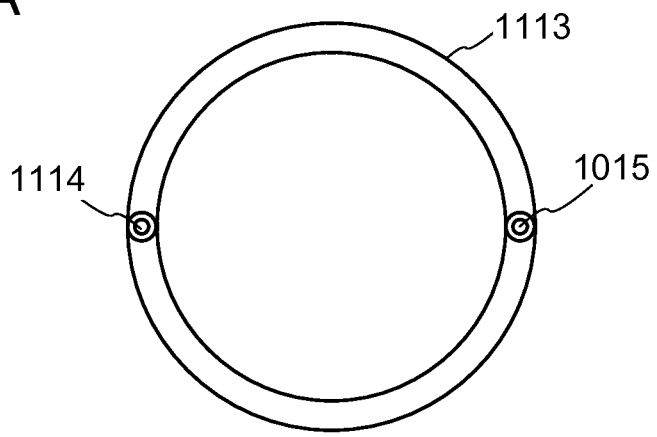
FIGS. 7A to 7C are schematic views of a fabricating apparatus of one embodiment of the present invention.
Figure 7B:
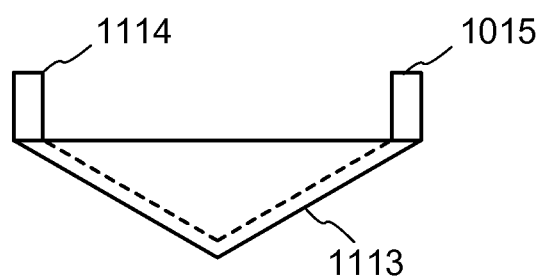
Figure 7C:
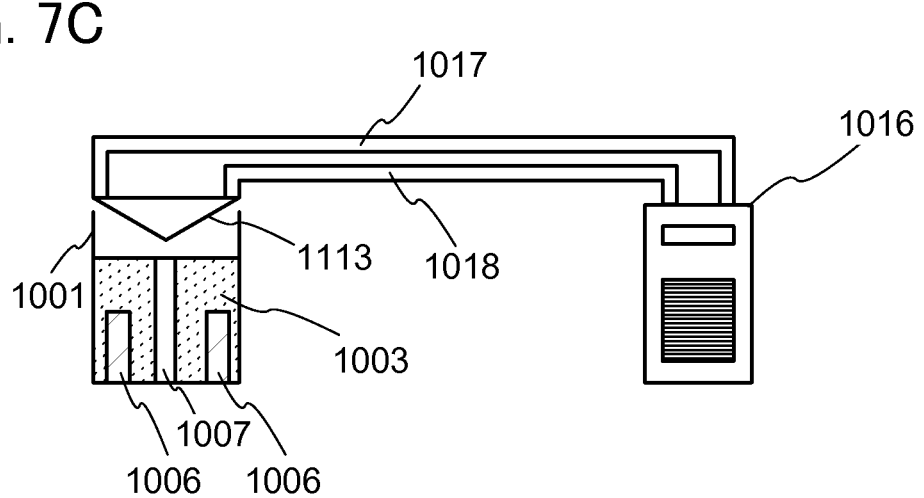

FIGS. 7A to 7C illustrate examples of a control device 1016 having a temperature controlling function provided outside the cooler 1113. FIG. 7A is a plan view of the cooler 1113. FIG. 7B is a front view of the cooler 1113. In an example shown in FIG. 7C, the cooler 1113 is connected to the control device 1016 with pipes 1017 and 1018. A circuit is formed by connecting the cooler 1113 and the control device 1016 with the pipes 1017 and 1018.

The cooler 1113 is hollow and has an inflow port 1114 and an outflow port 1015. A refrigerant which is not illustrated can flow in each the cooler 1113, the control device 1016, and the pipes 1017 and 1018. A pump for letting a refrigerant flow, which is not illustrated, is provided in the control device 1016.

The heat absorbed by the cooler 1113 is absorbed by a refrigerant flowing inside the cooler 1113. In the case where a refrigerant flows through the pipe 1017 from the cooler 1113 to the control device 1016, the temperature of the refrigerant flowing the pipe 1017 is controlled by the control device 1016. After that, the refrigerant flows to the cooler 1113 through the pipe 1018, and the heat absorbed by the cooler 1113 is absorbed by the refrigerant again. The refrigerant circulates while an electrochemical reaction of the electrode 1006 is performed.

As the refrigerant, a liquid such as water and ethylene glycol, an inert gas such as nitrogen, argon, or carbon dioxide can be used.

When the vaporized solvent components of the electrolyte solution 1103 are condensed by the cooler 1113, the heat of the condensation is absorbed by the cooler. In the case where the electrolyte solution is heated to a high temperature so that the time for the electrochemical reaction can be shortened, the temperature of the cooler 1113 is also increased, whereby the cooling ability of the cooler 1113 is reduced.

In the case where propylene carbonate, whose flash point is approximately 132° C., is used as the solvent of the electrolyte solution, it is appropriate to set the upper limit of the heating temperature at approximately 100° C. for heating the electrolyte solution in consideration of the safety during the process. Even in that case, the temperature is still higher than the room temperature; thus, the solvent of the electrolyte solution is apt to vaporize, which is likely to cause variation of the components of the electrolyte solution.

In one embodiment of the present invention, the vaporized solvent components of the electrolyte solution 1103 are condensed and return to an electrolyte solution by the cooler 1113, and the temperature of the cooler 1113 can be kept constant by exchanging heat absorbed by the cooler 1113. As a result, heating the electrolyte solution can be facilitated and time for the electrochemical reaction can be shortened.

This embodiment can be implemented in an appropriate combination with any of the structures described in the other embodiments.

Embodiment 5

In this embodiment, a variety of modes of power storage devices fabricated according to one embodiment of the present invention will be described.

[Coin-Type Storage Battery]

Figure 9A:
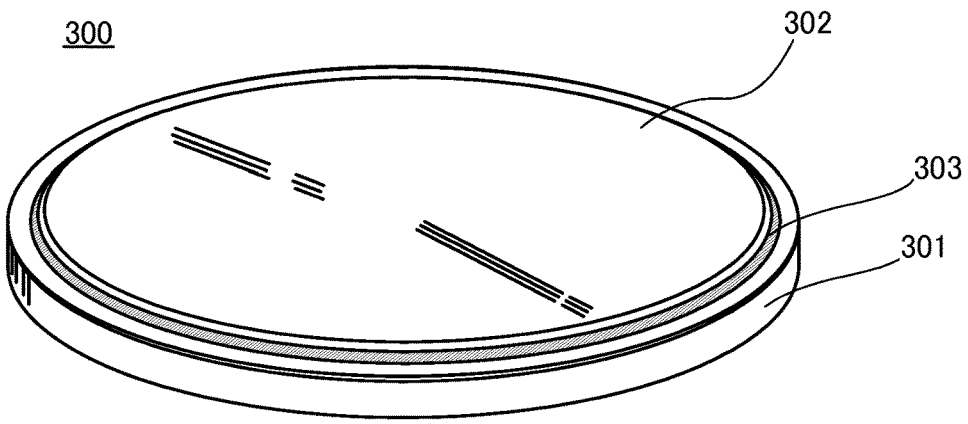
FIGS. 9A and 9B illustrate coin-type secondary batteries and FIG. 9C illustrates a cylindrical secondary battery.
Figure 9B:
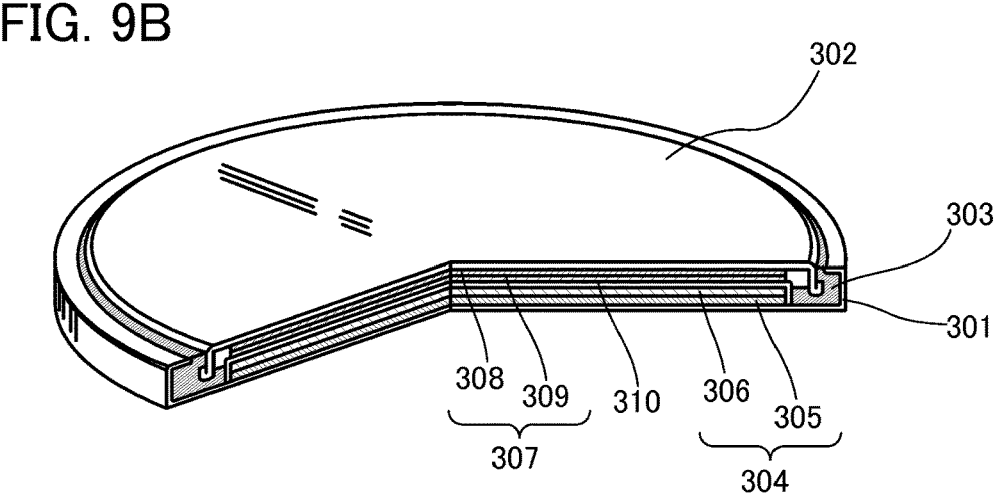

FIG. 9A is an external view of a coin-type (single-layer flat type) storage battery, and FIG. 9B is a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. The positive electrode active material layer 306 may further include a binder for increasing adhesion of positive electrode active materials, a conductive additive for increasing the conductivity of the positive electrode active material layer, and the like in addition to the active materials. As a conductive additive, a material that has a large specific surface area is preferably used; for example, acetylene black (AB) can be used. Alternatively, a carbon material such as a carbon nanotube, graphene, or fullerene can be used.

A negative electrode 307 includes a negative electrode current collector 308 and a negative electrode active material layer 309 provided in contact with the negative electrode current collector 308. The negative electrode active material layer 309 may further include a binder for increasing adhesion of negative electrode active materials, a conductive additive for increasing the conductivity of the negative electrode active material layer, and the like in addition to the negative electrode active materials. A separator 310 and an electrolyte (not illustrated) are provided between the positive electrode active material layer 306 and the negative electrode active material layer 309.

Any of the materials described in Embodiment 1 is used as a negative electrode active material in the negative electrode active material layer 309. Before a battery is assembled, oxidation treatment and reduction treatment are performed on the negative electrode 307 in an electrolytic solution with the use of the apparatus described in Embodiments 1 to 4.

Any of the materials for the current collectors that are described in Embodiment 1 is used for the current collectors such as the positive electrode current collector 305 and the negative electrode current collector 308.

For the positive electrode active material layer 306, a material into and from which lithium ions can be inserted and extracted can be used. For example, any of the materials for the positive electrode active material layer that are described in Embodiment 1 is used. Before a battery is assembled, oxidation treatment and reduction treatment are performed on the positive electrode 304 in an electrolytic solution with the use of the apparatus described in Embodiment 1 or 2.

The separator 310 can be formed using an insulator such as cellulose (paper), polyethylene with pores, or polypropylene with pores.

As an electrolyte in the electrolyte solution, a material which contains carrier ions is used. Typical examples of the electrolyte are lithium salts such as $LiPF_6$, $LiClO_4$, $LiAsF_6$, $LiBF_4$, $LiCF_3SO_3$, $Li(CF_3SO_2)_2N$, and $Li(C_2F_5SO_2)_2N$. One of these electrolytes may be used alone or two or more of them may be used in an appropriate combination and in an appropriate ratio.

Note that when carrier ions are alkali metal ions other than lithium ions, or alkaline-earth metal ions, instead of lithium in the above lithium salts, an alkali metal (e.g., sodium and potassium), an alkaline-earth metal (e.g., calcium, strontium, barium, beryllium, and magnesium) may be used for the electrolyte.

As a solvent of the electrolyte solution, a material with the carrier ion mobility is used. As the solvent of the electrolyte solution, an aprotic organic solvent is preferably used. Typical examples of aprotic organic solvents include ethylene carbonate (EC), propylene carbonate, dimethyl carbonate, diethyl carbonate (DEC), γ-butyrolactone, acetonitrile, dimethoxyethane, tetrahydrofuran, and the like, and one or more of these materials can be used. When a gelled high-molecular material is used as the solvent for the electrolyte solution, safety against liquid leakage and the like is improved. Further, the storage battery can be thinner and more lightweight. Typical examples of the gelled high-molecular material include silicone gel, acrylic gel, acrylonitrile gel, polyethylene oxide, polypropylene oxide, a fluorine-based polymer, and the like. Alternatively, the use of one or more of ionic liquids (room temperature molten salts) which have features of non-flammability and non-volatility as a solvent of the electrolyte solution can prevent the storage battery from exploding or catching fire even when the storage battery internally shorts out or the internal temperature increases owing to overcharging or the like.

For the positive electrode can 301 and the negative electrode can 302, a metal having corrosion resistance to an electrolyte solution, such as nickel, aluminum, or titanium, an alloy of such metals, or an alloy of such a metal and another metal (stainless steel or the like) can be used. Alternatively, the positive electrode can 301 and the negative electrode can 302 are preferably covered with nickel, aluminum, or the like in order to prevent corrosion due to the electrolytic solution. The positive electrode can 301 and the negative electrode can 302 are electrically connected to the positive electrode 304 and the negative electrode 307, respectively.

The negative electrode 307, the positive electrode 304, and the separator 310 are immersed in the electrolyte solution. Then, as illustrated in FIG. 9B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 can be fabricated.

Figure 9C:
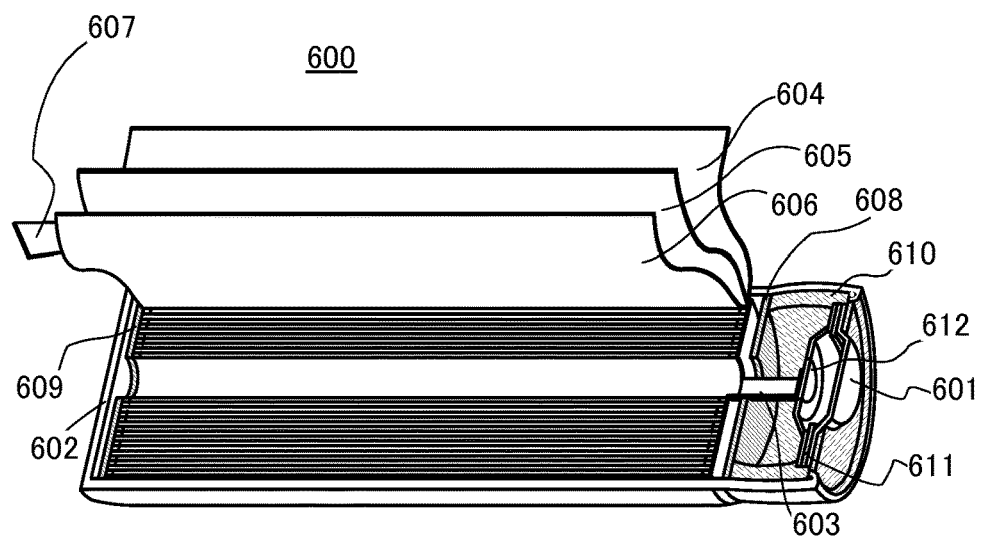

FIG. 9C illustrates an example of a cylindrical storage battery. FIG. 9C is a schematic cross-sectional view of the cylindrical storage battery.

The cylindrical storage battery 600 includes a positive electrode cap (battery cap) 601 and a battery can (outer can) 602. The positive electrode cap 601 and the battery can 602 are insulated from each other by a gasket (insulating gasket) 610.

FIG. 9C is a diagram schematically illustrating a cross section of the cylindrical storage battery. Inside the battery can 602 having a hollow cylindrical shape, a battery element in which a strip-like positive electrode 604 and a strip-like negative electrode 606 are wound with a stripe-like separator 605 interposed therebetween is provided. Although not illustrated, the battery element is wound around a center pin. One end of the battery can 602 is close and the other end thereof is open. For the battery can 602, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the battery can 602 is preferably covered with nickel, aluminum, or the like in order to prevent corrosion due to the electrolytic solution. Inside the battery can 602, the battery element in which the positive electrode, the negative electrode, and the separator are wound is provided between a pair of insulating plates 608 and 609 that face each other. Furthermore, a nonaqueous electrolytic solution (not illustrated) is injected inside the battery can 602 provided with the battery element. As the nonaqueous electrolytic solution, a nonaqueous electrolytic solution that is similar to those of the coin-type storage battery and a laminate storage battery can be used.

Although the positive electrode 604 and the negative electrode 606 can be formed in a manner similar to that of the positive electrode and the negative electrode of the coin-type storage battery described above, the difference lies in that, since the positive electrode and the negative electrode of the cylindrical storage battery are wound, active materials are formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap

601 and the positive electrode 604 when the internal pressure of the battery exceeds a predetermined threshold value. The PTC element 611, which serves as a thermally sensitive resistor whose resistance increases as temperature rises, limits the amount of current by increasing the resistance, in order to prevent abnormal heat generation. Note that barium titanate ($BaTiO_3$)-based semiconductor ceramic can be used for the PTC element.

Note that in this embodiment, the coin-type storage battery and the cylindrical storage battery are given as examples of the storage battery; however, any of storage batteries with a variety of shapes, such as a sealed storage battery and a square-type storage battery, can be used. Furthermore, a structure in which a plurality of positive electrodes, a plurality of negative electrodes, and a plurality of separators are stacked or wound may be employed.

[Structural Example of Power Storage System]

Structural examples of power storage systems will be described with reference to FIGS. 10A and 10B, FIGS. 11A-1 to 11B-2, and FIGS. 12A and 12B. Here, a power storage system refers to, for example, a device including a power storage device. The power storage system described in this embodiment includes a storage battery that is a power storage device fabricated according to one embodiment of the present invention.

Figure 10A:
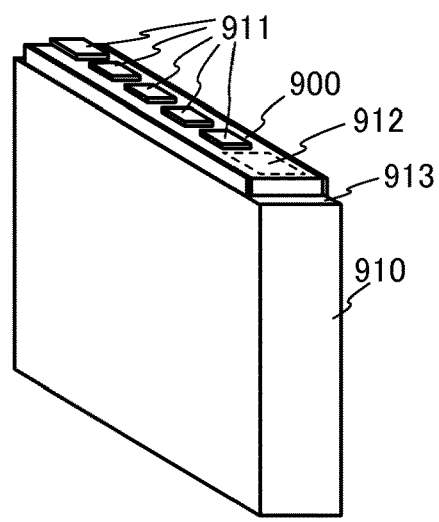
FIGS. 10A and 10B illustrate an example of a power storage system.
Figure 10B:
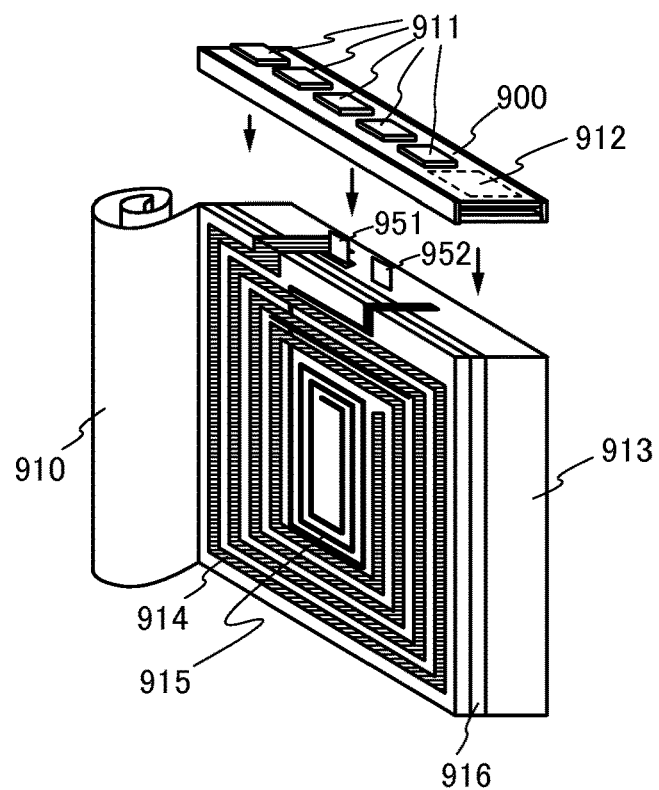

FIGS. 10A and 10B are external views of a power storage system. The power storage system includes a circuit board 900 and a storage battery 913. A label 910 is attached to the storage battery 913. As shown in FIG. 10B, the power storage system further includes a terminal 951, a terminal 952, an antenna 914, and an antenna 915.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may be provided.

The circuit 912 may be provided on the other side of the circuit board 900 where the terminals 951 and 952 are connected to the circuit board 900. Note that each of the antennas 914 and 915 is not limited to having a coil shape and may have a linear shape or a plate shape. Further, a planar antenna, an aperture antenna, a traveling-wave antenna, an EH antenna, a magnetic-field antenna, or a dielectric antenna may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The power storage system includes a layer 916 between the storage battery 913 and the antennas 914 and 915. The layer 916 has a function of blocking an electromagnetic field from the storage battery 913, for example. As the layer 916, for example, a magnetic body can be used.

Note that the structure of the power storage system is not limited to that shown in FIGS. 10A and 10B.

For example, as shown in FIGS. 11A1 and 11A2, two opposite surfaces of the storage battery 913 in FIGS. 10A and 10B may be provided with respective antennas. FIG. 11A1 is an external view showing one side of the opposing surfaces, and FIG. 11A2 is an external view showing the other side of the opposing surfaces. For portions similar to those in FIGS. 10A and 10B, the description of the power storage system illustrated in FIGS. 10A and 10B can be referred to as appropriate.

As illustrated in FIG. 11A1, the antenna 914 is provided on one of the opposite surfaces of the storage battery 913 with the layer 916 interposed therebetween, and as illustrated in FIG. 11A2, an antenna 915 is provided on the other of the opposite surfaces of the storage battery 913 with the layer 917 interposed therebetween. The layer 917 has a function of blocking an electromagnetic field from the storage battery 913. As the layer 917, for example, a magnetic body can be used.

With the above structure, both of the antennas 914 and 915 can be increased in size.

Alternatively, as illustrated in FIGS. 11B1 and 11B2, two opposite surfaces of the storage battery 913 in FIGS. 10A and 10B may be provided with different types of antennas. FIG. 11B1 is an external view showing one side of the opposing surfaces, and FIG. 11B2 is an external view showing the other side of the opposing surfaces. For portions similar to those in FIGS. 10A and 10B, the description of the power storage system illustrated in FIGS. 10A and 10B can be referred to as appropriate.

As illustrated in FIG. 11B1, the antennas 914 and 915 are provided on one of the opposite surfaces of the storage battery 913 with the layer 916 interposed therebetween, and as illustrated in FIG. 11 B2, an antenna 918 is provided on the other of the opposite surfaces of the storage battery 913 with the layer 917 interposed therebetween. The antenna 918 has a function of performing data communication with an external device, for example. An antenna with a shape that can be applied to the antennas 914 and 915, for example, can be used as the antenna 918. As an example of a method for communication between the power storage system and another device via the antenna 918, a response method that can be used between the power storage system and another device, such as NFC, can be employed.

Figure 12A:
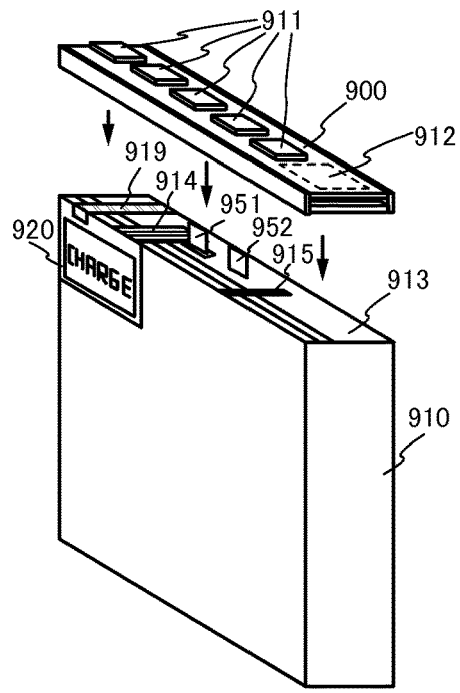
FIGS. 12A and 12B each illustrate an example of a power storage system.

Alternatively, as illustrated in FIG. 12A, the storage battery 913 in FIGS. 10A and 10B may be provided with a display device 920. The display device 920 is electrically connected to the terminal 911 via a terminal 919. It is possible that the label 910 is not provided in a portion where the display device 920 is provided. For portions similar to those in FIGS. 10A and 10B, the description of the power storage system illustrated in FIGS. 10A and 10B can be referred to as appropriate.

The display device 920 can display, for example, an image showing whether or not charging is being carried out, an image showing the amount of stored power, or the like. As the display device 920, electronic paper, a liquid crystal display device, an electroluminescent (EL) display device, or the like can be used. For example, power consumption of the display device 920 can be reduced when electronic paper is used.

Figure 12B:
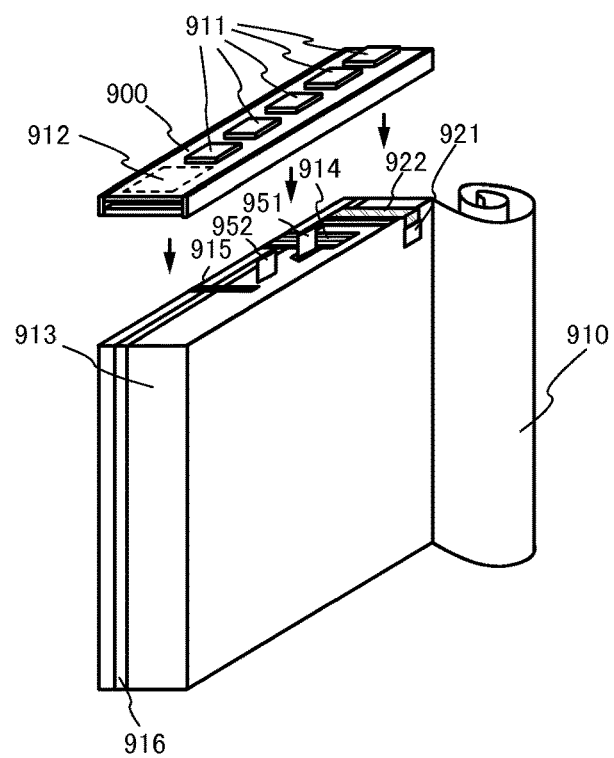

Alternatively, as illustrated in FIG. 12B, the storage battery 913 illustrated in FIGS. 10A and 10B may be provided with a sensor 921. The sensor 921 is electrically connected to the terminal 911 via a terminal 922. For portions similar to those in FIGS. 10A and 10B, the description of the power storage system illustrated in FIGS. 10A and 10B can be referred to as appropriate.

As the sensor 921, a sensor having a function of measuring force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays can be used. With the sensor 921, for example, data on the environment (e.g., temperature) where the power storage system is placed can be acquired and stored in a memory in the circuit 912.

The electrode of one embodiment of the present invention is used in the storage battery and the power storage system that are described in this embodiment. The capacity of the storage battery and the power storage system can thus be high. Furthermore, energy density can be high. Moreover, reliability can be high, and life can be long.

Embodiment 5 can be implemented in appropriate combination with any of the structures described in the other embodiments.

Embodiment 6

In this embodiment, an example of an electronic device including a flexible storage battery that is a power storage device fabricated according to one embodiment of the present invention will be described.

FIGS. 13A to 13G illustrate examples of electronic devices including the flexible storage batteries described in the above embodiments. Examples of an electronic device including a flexible power storage device include television devices (also referred to as televisions or television receivers), monitors of computers or the like, cameras such as digital cameras or digital video cameras, digital photo frames, mobile phones (also referred to as mobile phones or mobile phone devices), portable game machines, portable information terminals, audio reproducing devices, large game machines such as pachinko machines, and the like.

In addition, a flexible power storage device can be incorporated along a curved inside/outside wall surface of a house or a building or a curved interior/exterior surface of a vehicle.

Figure 13A:
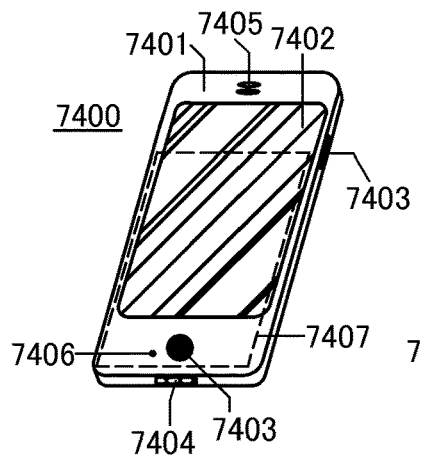
FIGS. 13A to 13G each illustrate an example of an electronic device.

FIG. 13A illustrates an example of a cellular phone. A cellular phone 7400 is provided with a display portion 7402 incorporated in a housing 7401, an operation button 7403, an external connection port 7404, a speaker 7405, a microphone 7406, and the like. Note that the cellular phone 7400 includes a power storage device 7407.

Figure 13B:
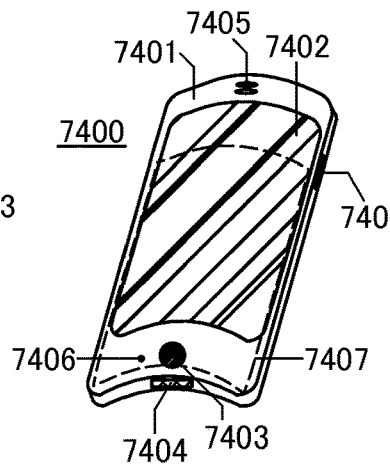
Figure 13C:
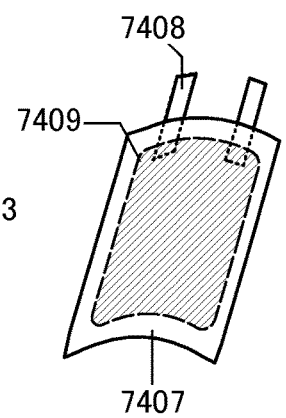

The cellular phone 7400 illustrated in FIG. 13B is bent. When the whole cellular phone 7400 is bent by the external force, the power storage device 7407 included in the cellular phone 7400 is also bent. FIG. 13C illustrates the bent power storage device 7407. As the power storage device 7407, a thin storage battery is used here. The power storage device 7407 is fixed in a state of being bent. Note that the power storage device 7407 includes a lead electrode 7408 electrically connected to a current collector 7409. The current collector is, for example, copper foil, and partly alloyed with gallium; thus, adhesion between the current collector 7409 and an active material layer in contact with the current collector 7409 is improved and the power storage device 7407 can have high reliability even in a state of being bent.

Figure 13D:
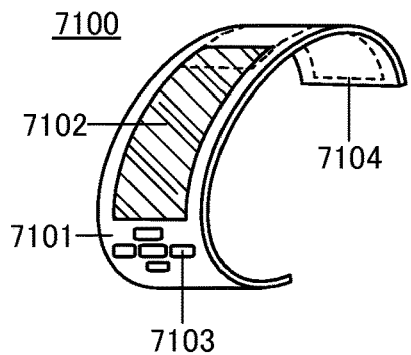
Figure 13E:
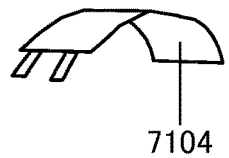

FIG. 13D illustrates an example of a bangle-type display device. A portable display device 7100 includes a housing 7101, a display portion 7102, an operation button 7103, and a power storage device 7104. FIG. 13E illustrates the bent power storage device 7104. When the display device is worn on a user's arm while the power storage device 7104 is bent, the housing changes its form and the curvature of a part or the whole of the power storage device 7104 is changed. Note that the radius of curvature of a curve at a point refers to the radius of the circular arc that best approximates the curve at that point. The reciprocal of the radius of curvature is curvature. Specifically, a part or the whole of the housing or the main surface of the power storage device 7104 is changed in the range of radius of curvature from 40 mm to 150 mm. When the radius of curvature at the main surface of the power storage device 7104 is 40 mm to 150 mm, the reliability can be kept high.

Figure 13F:
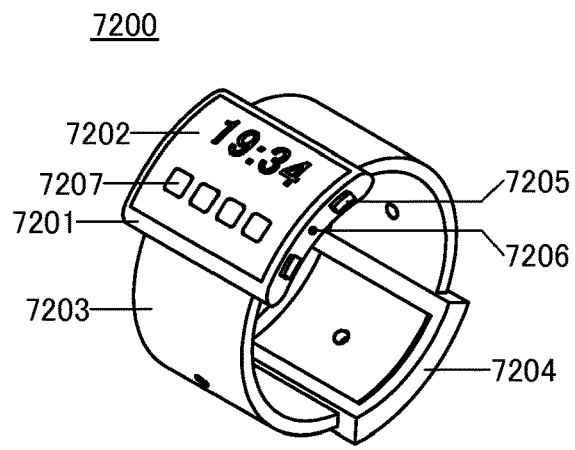

FIG. 13F illustrates an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is bent, and images can be displayed on the bent display surface. Further, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, power ON/OFF, ON/OFF of wireless communication, setting and cancellation of silent mode, and setting and cancellation of power saving mode can be performed. For example, the functions of the operation button 7205 can be set freely by the operating system incorporated in the portable information terminal 7200.

Further, the portable information terminal 7200 can perform near field communication that is a communication method based on an existing communication standard. In that case, for example, mutual communication between the portable information terminal 7200 and a headset capable of wireless communication can be performed, and thus handsfree calling is possible.

Moreover, the portable information terminal 7200 includes the input output terminal 7206, and data can be directly transmitted to and received from another information terminal via a connector. Power charging through the input output terminal 7206 is possible. Note that the charging operation may be performed by wireless power feeding without using the input output terminal 7206.

The display portion 7202 of the portable information terminal 7200 is provided with a power storage device including the electrode member of one embodiment of the present invention. For example, the power storage device 7104 illustrated in FIG. 13E that is in the state of being curved can be provided in the housing 7201. Alternatively, the power storage device 7104 illustrated in FIG. 13E can be provided in the band 7203 such that it can be curved.

Figure 13G:
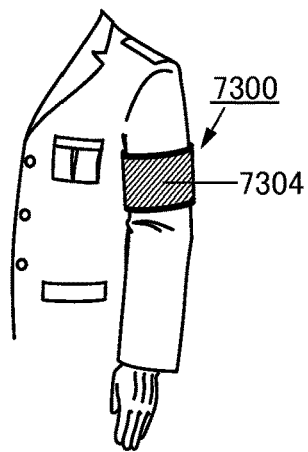

FIG. 13G illustrates an example of an armband-type display device. A display device 7300 includes a display portion 7304 and the power storage device of one embodiment of the present invention. The display device 7300 can include a touch sensor in the display portion 7304 and can serve as a portable information terminal.

The display surface of the display portion 7304 is bent, and images can be displayed on the bent display surface. A display state of the display device 7300 can be changed by, for example, near field communication that is a communication method based on an existing communication standard.

The display device 7300 includes an input output terminal, and data can be directly transmitted to and received from another information terminal via a connector. Power charging through the input output terminal is possible. Note that the charging operation may be performed by wireless power feeding without using the input output terminal.

This embodiment can be implemented in appropriate combination with any of the other embodiments.

Embodiment 7

In this embodiment, examples of electronic devices that can include power storage devices will be described.

Figure 14A:
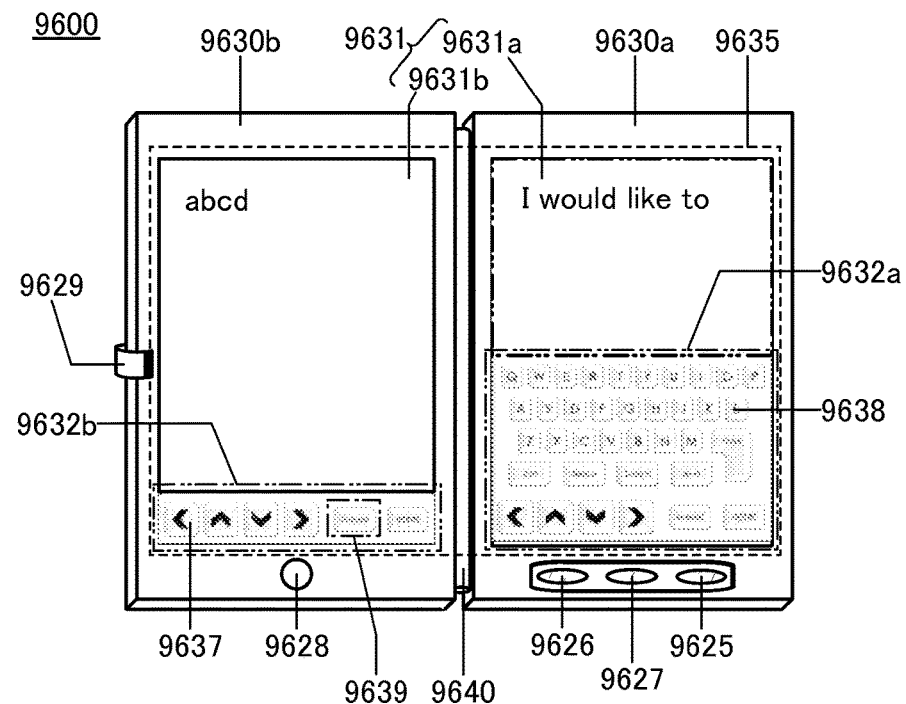
FIGS. 14A to 14C illustrate an example of an electronic device.
Figure 14B:
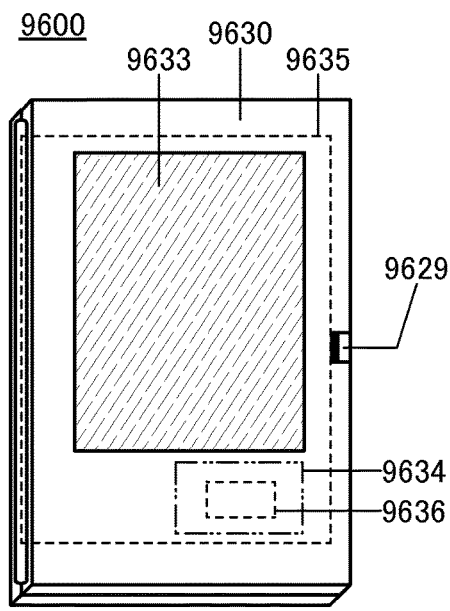

FIGS. 14A and 14B illustrate an example of a tablet terminal that can be folded in half. A tablet terminal 9600 illustrated in FIGS. 14A and 14B includes a housing 9630a, a housing 9630b, a movable portion 9640 connecting the housings 9630a and 9630b, a display portion 9631 including a display portion 9631a and a display portion 9631b, a display mode changing switch 9626, a power switch 9627, a power saving mode changing switch 9625, a fastener 9629, and an operation switch 9628. FIG. 14A illustrates the tablet terminal 9600 that is opened, and FIG. 14B illustrates the tablet terminal 9600 that is closed.

The tablet terminal 9600 includes a power storage unit 9635 inside the housings 9630a and 9630b. The power storage unit 9635 is provided across the housings 9630a and 9630b, passing through the movable portion 9640.

Part of the display portion 9631a can be a touch panel region 9632a, and data can be input by touching operation keys 9638 that are displayed. Note that FIG. 14A shows, as an example, that half of the area of the display portion 9631a has only a display function and the other half of the area has a touch panel function. However, the structure of the display portion 9631a is not limited to this, and all the area of the display portion 9631a may have a touch panel function. For example, all the area of the display portion 9631a can display a keyboard and serve as a touch panel while the display portion 9631b can be used as a display screen.

As in the display portion 9631a, part of the display portion 9631b can be a touch panel region 9632b. When a keyboard display switching button 9639 displayed on the touch panel is touched with a finger, a stylus, or the like, a keyboard can be displayed on the display portion 9631b.

Touch input can be performed in the touch panel region 9632a and the touch panel region 9632b at the same time.

The display mode changing switch 9626 allows switching between a landscape mode and a portrait mode, color display and black-and-white display, and the like. The power saving mode changing switch 9625 can control display luminance in accordance with the amount of external light in use of the tablet terminal 9600, which is measured with an optical sensor incorporated in the tablet terminal 9600. In addition to the optical sensor, other detecting devices such as sensors for determining inclination, such as a gyroscope or an acceleration sensor, may be incorporated in the tablet terminal.

Although the display portion 9631a and the display portion 9631b have the same area in FIG. 14A, one embodiment of the present invention is not limited to this example. The display portion 9631a and the display portion 9631b may have different areas or different display quality. For example, one of the display portions 9631a and 9631b may display higher definition images than the other.

The tablet terminal is closed in FIG. 14B. The tablet terminal includes the housing 9630, a solar cell 9633, and a charge and discharge control circuit 9634 including a DC-DC converter 9636. The power storage unit of one embodiment of the present invention is used as the power storage unit 9635.

The tablet terminal 9600 can be folded such that the housings 9630a and 9630b overlap with each other when not in use. Thus, the display portions 9631a and 9631b can be protected, which increases the durability of the tablet terminal 9600. In addition, the power storage unit 9635 of one embodiment of the present invention has flexibility and can be repeatedly bent without a significant decrease in charge and discharge capacity. Thus, a highly reliable tablet terminal can be provided.

The tablet terminal illustrated in FIGS. 14A and 14B can also have a function of displaying various kinds of data (e.g., a still image, a moving image, and a text image), a function of displaying a calendar, a date, or the time on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processor, and the like. Note that the solar cell 9633 is preferable because the solar cell 9633 can be provided on one or both surfaces of the housing 9630 and the power storage unit 9635 can be charged efficiently. The use of a lithium-ion battery as the power storage unit 9635 brings an advantage such as a reduction in size.

Figure 14C:
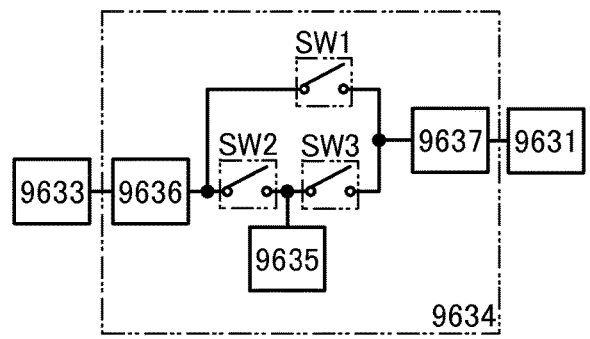

The structure and operation of the charge and discharge control circuit 9634 illustrated in FIG. 14B will be described with reference to a block diagram in FIG. 14C. The solar cell 9633, the power storage unit 9635, the DC-DC converter 9636, a converter 9637, switches SW1 to SW3, and the display portion 9631 are illustrated in FIG. 14C, and the power storage unit 9635, the DC-DC converter 9636, the converter 9637, and the switches SW1 to SW3 correspond to the charge and discharge control circuit 9634 in FIG. 14B.

First, an example of operation when electric power is generated by the solar cell 9633 using external light will be described. The voltage of electric power generated by the solar cell is raised or lowered by the DC-DC converter 9636 to a voltage for charging the power storage unit 9635. When the display portion 9631 is operated with the electric power from the solar cell 9633, the switch SW1 is turned on and the voltage of the electric power is raised or lowered by the converter 9637 to a voltage needed for operating the display portion 9631. When display on the display portion 9631 is not performed, the switch SW1 is turned off and the switch SW2 is turned on, so that the power storage unit 9635 can be charged.

Note that the solar cell 9633 is described as an example of a power generation means; however, one embodiment of the present invention is not limited to this example. The power storage unit 9635 may be charged using another power generation means such as a piezoelectric element or a thermoelectric conversion element (Peltier element). For example, the power storage unit 9635 may be charged with a non-contact power transmission module capable of performing charging by transmitting and receiving electric power wirelessly (without contact), or any of the other charge means used in combination.

Figure 15:
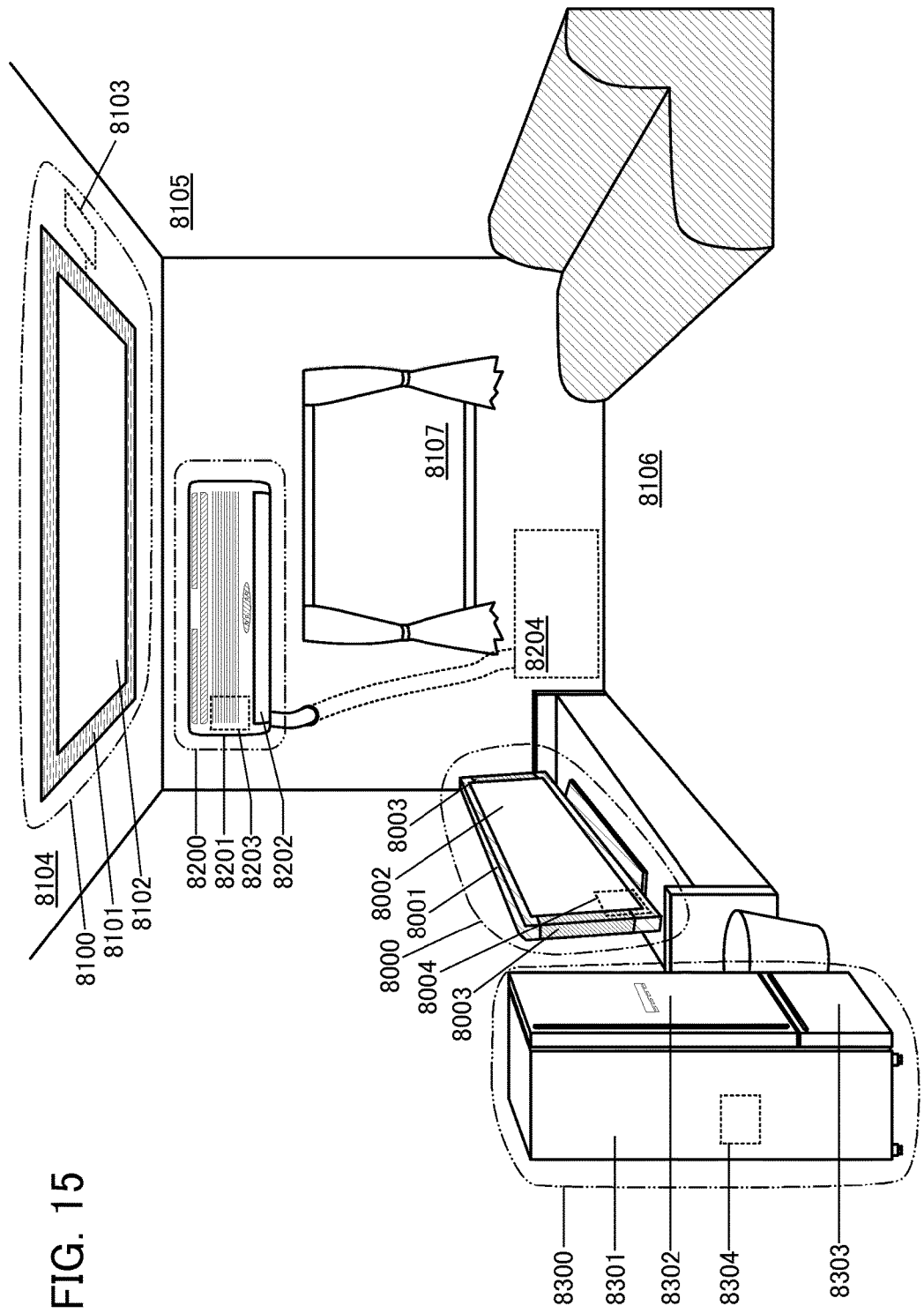
FIG. 15 illustrates an example of an electronic device.

FIG. 15 illustrates other examples of electronic devices. In FIG. 15, a display device 8000 is an example of an electronic device including a power storage device 8004 of one embodiment of the present invention. Specifically, the display device 8000 corresponds to a display device for TV broadcast reception and includes a housing 8001, a display portion 8002, speaker portions 8003, and the power storage device 8004. The power storage device 8004 of one embodiment of the present invention is provided in the housing 8001. The display device 8000 can receive electric power from a commercial power supply. Alternatively, the display device 8000 can use electric power stored in the power storage device 8004. Thus, the display device 8000 can be operated with the use of the power storage device 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 15, an installation lighting device 8100 is an example of an electronic device including a power storage device 8103 of one embodiment of the present invention. Specifically, the lighting device 8100 includes a housing 8101, a light source 8102, and the power storage device 8103. Although FIG. 15 illustrates the case where the power storage device 8103 is provided in a ceiling 8104 on which the housing 8101 and the light source 8102 are installed, the power storage device 8103 may be provided in the housing 8101. The lighting device 8100 can receive electric power from a commercial power supply. Alternatively, the lighting device 8100 can use electric power stored in the power storage device 8103. Thus, the lighting device 8100 can be operated with the use of power storage device 8103 of one embodiment of the present invention as an uninterruptible power supply even when electric power cannot be supplied from a commercial power supply due to power failure or the like.

Note that although the installation lighting device 8100 provided in the ceiling 8104 is illustrated in FIG. 15 as an example, the power storage device of one embodiment of the present invention can be used in an installation lighting device provided in, for example, a wall 8105, a floor 8106, a window 8107, or the like other than the ceiling 8104. Alternatively, the power storage device of one embodiment of the present invention can be used in a tabletop lighting device or the like.

As the light source 8102, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 15, an air conditioner including an indoor unit 8200 and an outdoor unit 8204 is an example of an electronic device including a power storage device 8203 of one embodiment of the present invention. Specifically, the indoor unit 8200 includes a housing 8201, an air outlet 8202, and the power storage device 8203. Although FIG. 15 illustrates the case where the power storage device 8203 is provided in the indoor unit 8200, the power storage device 8203 may be provided in the outdoor unit 8204. Alternatively, the power storage device 8203 may be provided in both the indoor unit 8200 and the outdoor unit 8204. The air conditioner can receive electric power from a commercial power supply. Alternatively, the air conditioner can use electric power stored in the power storage device 8203. Particularly in the case where the power storage devices 8203 are provided in both the indoor unit 8200 and the outdoor unit 8204, the air conditioner can be operated with the use of the power storage device 8203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 15 as an example, the power storage device of one embodiment of the present invention can be used in an air conditioner in which the functions of an indoor unit and an outdoor unit are integrated in one housing.

In FIG. 15, an electric refrigerator-freezer 8300 is an example of an electronic device including a power storage device 8304 of one embodiment of the present invention. Specifically, the electric refrigerator-freezer 8300 includes a housing 8301, a door for a refrigerator 8302, a door for a freezer 8303, and the power storage device 8304. The power storage device 8304 is provided in the housing 8301 in FIG. 15. The electric refrigerator-freezer 8300 can receive electric power from a commercial power supply. Alternatively, the electric refrigerator-freezer 8300 can use electric power stored in the power storage device 8304. Thus, the electric refrigerator-freezer 8300 can be operated with the use of the power storage device 8304 of one embodiment of the present invention as an uninterruptible power supply even when electric power cannot be supplied from a commercial power supply due to power failure or the like.

Note that among the electronic devices described above, a high-frequency heating apparatus such as a microwave oven and an electronic device such as an electric rice cooker require high power in a short time. The tripping of a breaker of a commercial power supply in use of an electronic device can be prevented by using the power storage device of one embodiment of the present invention as an auxiliary power supply for supplying electric power which cannot be supplied enough by a commercial power supply.

In addition, in a time period when electronic devices are not used, particularly when the proportion of the amount of electric power which is actually used to the total amount of electric power which can be supplied from a commercial power supply source (such a proportion referred to as a usage rate of electric power) is low, electric power can be stored in the power storage device, whereby the usage rate of electric power can be reduced in a time period when the electronic devices are used. For example, in the case of the electric refrigerator-freezer 8300, electric power can be stored in the power storage device 8304 in night time when the temperature is low and the door for a refrigerator 8302 and the door for a freezer 8303 are not often opened or closed. On the other hand, in daytime when the temperature is high and the door for a refrigerator 8302 and the door for a freezer 8303 are frequently opened and closed, the power storage device 8304 is used as an auxiliary power supply; thus, the usage rate of electric power in daytime can be reduced.

This embodiment can be implemented in appropriate combination with any of the other embodiments.

Embodiment 8

In this embodiment, examples of vehicles using power storage devices will be described.

The use of power storage devices in vehicles enables production of next-generation clean energy vehicles such as hybrid electric vehicles (HEVs), electric vehicles (EVs), and plug-in hybrid electric vehicles (PHEVs).

Figure 16A:
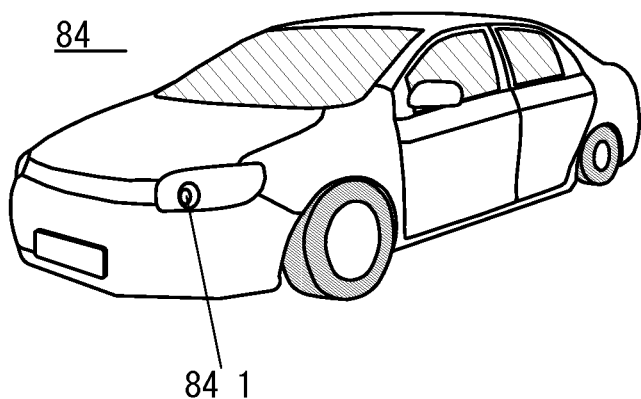
FIGS. 16A and 16B illustrate examples of electronic devices.
Figure 16B:
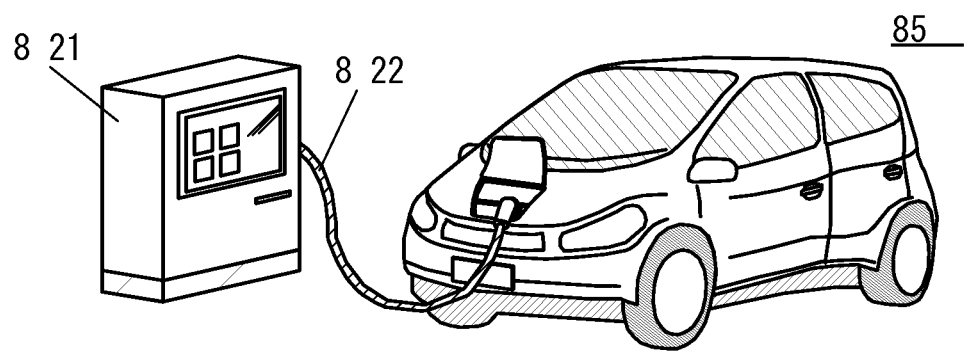

FIGS. 16A and 16B each illustrate an example of a vehicle using one embodiment of the present invention. An automobile 8400 illustrated in FIG. 16A is an electric vehicle that runs on the power of an electric motor. Alternatively, the automobile 8400 is a hybrid electric vehicle capable of driving appropriately using either the electric motor or the engine. One embodiment of the present invention can provide a high-mileage vehicle. The automobile 8400 includes the power storage device. The power storage device is used not only for driving the electric motor, but also for supplying electric power to a light-emitting device such as a headlight 8401 or a room light (not illustrated).

The power storage device can also supply electric power to a display device of a speedometer, a tachometer, or the like included in the automobile 8400. Furthermore, the power storage device can supply electric power to a semiconductor device included in the automobile 8400, such as a navigation system.

FIG. 16B illustrates an automobile 8500 including the power storage device. The automobile 8500 can be charged when the power storage device is supplied with electric power through external charging equipment by a plug-in system, a contactless power feeding system, or the like. In FIG. 16B, a power storage device included in the automobile 8500 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The ground-based charging apparatus 8021 may be a charging station provided in a commerce facility or a power source in a house. For example, with the use of a plug-in technique, the power storage device (not illustrated) included in the automobile 8500 can be charged by being supplied with electric power from outside. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between vehicles. Furthermore, a solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, the power storage device can have improved cycle characteristics and reliability. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the driving distance. Furthermore, the power storage device included in the vehicle can be used as a power source for supplying electric power to products other than the vehicle. In such a case, the use of a commercial power source can be avoided at peak time of electric power demand.

This embodiment can be implemented in an appropriate combination with any of the structures described in the other embodiments.

Embodiment 9

In this embodiment, a battery management unit (BMU) which can be combined with a battery cell including the material described in the above embodiment and a transistor suitable for a circuit included in the battery management unit are described with reference to FIG. 17, FIGS. 18A to 18C, FIG. 19, FIG. 20, FIGS. 21A to 21C, FIG. 22, and FIG. 23. In this embodiment, a battery management unit of a power storage device including battery cells that are connected in series is particularly described.

When a plurality of battery cells connected in series are charged and discharged repeatedly, each battery cell has different capacity (output voltage) from one another due to the variation in charge and discharge characteristics among the battery cells. A discharge capacity of all of the plurality of battery cells connected in series depends on a battery cell with small capacity. The variation in capacities among the battery cells reduces the capacity of the all the battery cells at the time of discharging. Charging based on a battery cell with small capacity may cause insufficient charging. Charging based on a battery cell with high capacity may cause overcharge.

Thus, the battery management unit of the power storage device including battery cells connected in series has a function of reducing variation in capacities among the battery cells which causes insufficient charging or overcharge. Although circuit structures for reducing variation in capacities among the battery cells include a resistive type, a capacitor type, and an inductor type, here, a circuit structure which can reduce variation in capacities among the battery cells using transistors with a low off-state current is explained as an example.

A transistor including an oxide semiconductor in its channel formation region (an OS transistor) is preferably used as the transistor with a low off-state current. When an OS transistor with a low off-state current is used in the circuit of the battery management unit of the power storage device, the amount of electric charge leaking from a battery can be reduced, and reduction in capacity with the lapse of time can be suppressed.

As the oxide semiconductor used in the channel formation region, an In-M-Zn oxide (M is Ga, Y, Zr, La, Ce, or Nd) is used. In the case where the atomic ratio of the metal elements of a target for forming an oxide semiconductor film is In:M:Zn=$x_1$:$y_1$:$z_1$, $x_1/y_1$ is preferably greater than or equal to ⅓ and less than or equal to 6, further preferably greater than or equal to 1 and less than or equal to 6, and $z_1/y_1$ is preferably greater than or equal to ⅓ and less than or equal to 6, further preferably greater than or equal to 1 and less than or equal to 6. Note that when $z_1/y_1$ is greater than or equal to 1 and less than or equal to 6, a CAAC-OS film as the oxide semiconductor film is easily formed.

Here, the details of the CAAC-OS film are described.

The CAAC-OS film is one of oxide semiconductor films having a plurality of c-axis aligned crystal parts.

In a combined analysis image (also referred to as a high-resolution TEM image) of a bright-field image and a diffraction pattern of a CAAC-OS film, which is obtained using a transmission electron microscope (TEM), a plurality of crystal parts can be observed. However, in the high-resolution TEM image, a boundary between crystal parts, that is, a grain boundary is not clearly observed. Thus, in the CAAC-OS film, a reduction in electron mobility due to the grain boundary is less likely to occur.

According to the high-resolution cross-sectional TEM image of the CAAC-OS film observed in a direction substantially parallel to a sample surface, metal atoms are arranged in a layered manner in the crystal parts. Each metal atom layer has a morphology reflecting unevenness of a surface over which the CAAC-OS film is formed (hereinafter, a surface over which the CAAC-OS film is formed is referred to as a formation surface) or of a top surface of the CAAC-OS film, and is arranged parallel to the formation surface or the top surface of the CAAC-OS film.

On the other hand, according to the high-resolution planar TEM image of the CAAC-OS film observed in a direction substantially perpendicular to the sample surface, metal atoms are arranged in a triangular or hexagonal configuration in the crystal parts. However, there is no regularity of arrangement of metal atoms between different crystal parts.

A CAAC-OS film is subjected to structural analysis with an X-ray diffraction (XRD) apparatus. For example, when the CAAC-OS film including an $InGaZnO_4$ crystal is analyzed by an out-of-plane method, a peak appears frequently when the diffraction angle (2θ) is around 31°. This peak is derived from the (009) plane of the $InGaZnO_4$ crystal, which indicates that crystals in the CAAC-OS film have c-axis alignment, and that the c-axes are aligned in a direction substantially perpendicular to the formation surface or the top surface of the CAAC-OS film.

Note that when the CAAC-OS film with an $InGaZnO_4$ crystal is analyzed by an out-of-plane method, a peak of 2θ may also be observed at around 36°, in addition to the peak of 2θ at around 31°. The peak of 2θ at around 36° indicates that a crystal having no c-axis alignment is included in part of the CAAC-OS film. It is preferable that in the CAAC-OS film, a peak of 2θ appear at around 31° and a peak of 2θ not appear at around 36°.

The CAAC-OS film is an oxide semiconductor film having low impurity concentration. The impurity is an element other than the main components of the oxide semiconductor film, such as hydrogen, carbon, silicon, or a transition metal element. In particular, an element that has higher bonding strength to oxygen than a metal element included in the oxide semiconductor film, such as silicon, disturbs the atomic arrangement of the oxide semiconductor film by depriving the oxide semiconductor film of oxygen and causes a decrease in crystallinity. Further, a heavy metal such as iron or nickel, argon, carbon dioxide, or the like has a large atomic radius (molecular radius), and thus disturbs the atomic arrangement of the oxide semiconductor film and causes a decrease in crystallinity when it is contained in the oxide semiconductor film. Note that the impurity contained in the oxide semiconductor film might serve as a carrier trap or a carrier generation source.

The CAAC-OS film is an oxide semiconductor film having a low density of defect states. In some cases, oxygen vacancies in the oxide semiconductor film serve as carrier traps or serve as carrier generation sources when hydrogen is captured therein.

The state in which impurity concentration is low and density of defect states is low (the number of oxygen vacancies is small) is referred to as a "highly purified intrinsic" or "substantially highly purified intrinsic" state. A highly purified intrinsic or substantially highly purified intrinsic oxide semiconductor film has few carrier generation sources, and thus can have a low carrier density. Thus, a transistor including the oxide semiconductor film rarely has negative threshold voltage (is rarely normally on). The highly purified intrinsic or substantially highly purified intrinsic oxide semiconductor film has few carrier traps. Accordingly, the transistor including the oxide semiconductor film has little variation in electrical characteristics and high reliability. Electric charge trapped by the carrier traps in the oxide semiconductor film takes a long time to be released, and might behave like fixed electric charge. Thus, the transistor which includes the oxide semiconductor film having high impurity concentration and a high density of defect states has unstable electrical characteristics in some cases.

With the use of the CAAC-OS film in a transistor, variation in the electrical characteristics of the transistor due to irradiation with visible light or ultraviolet light is small.

Since the OS transistor has a wider band gap than a transistor including silicon in its channel formation region (a Si transistor), dielectric breakdown is unlikely to occur when a high voltage is applied. Although a voltage of several hundreds of volts is generated when battery cells are connected in series, the above-described OS transistor is suitable for a circuit of a battery management unit which is used for such battery cells in the power storage device.

FIG. 17 is an example of a block diagram of the power storage device. A power storage device 1300 illustrated in FIG. 17 includes a terminal pair 1301, a terminal pair 1302, a switching control circuit 1303, a switching circuit 1304, a switching circuit 1305, a voltage transformation control circuit 1306, a voltage transformer circuit 1307, and a battery portion 1308 including a plurality of battery cells 1309 connected in series.

In the power storage device 1300 illustrated in FIG. 17, a portion including the terminal pair 1301, the terminal pair 1302, the switching control circuit 1303, the switching circuit 1304, the switching circuit 1305, the voltage transformation control circuit 1306, and the voltage transformer circuit 1307 can be referred to as a battery management unit.

The switching control circuit 1303 controls operations of the switching circuits 1304 and 1305. Specifically, the switching control circuit 1303 selects battery cells to be discharged (a discharge battery cell group) and battery cells to be charged (a charge battery cell group) in accordance with voltage measured for every battery cell 1309.

Furthermore, the switching control circuit 1303 outputs a control signal S1 and a control signal S2 on the basis of the selected discharge battery cell group and the selected charge battery cell group. The control signal S1 is output to the switching circuit 1304. The control signal S1 controls the switching circuit 1304 so that the terminal pair 1301 and the discharge battery cell group are connected. In addition, the control signal S2 is output to the switching circuit 1305. The control signal S2 controls the switching circuit 1305 so that the terminal pair 1302 and the charge battery cell group are connected.

The switching control circuit 1303 generates the control signal S1 and the control signal S2 on the basis of connection relation of the switching circuit 1304, the switching circuit 1305, and the voltage transformer circuit 1307 so that terminals having the same polarity of the terminal pair 1301 and the discharge battery cell group are connected with each other, or terminals having the same polarity of the terminal pair 1302 and the charge battery cell group are connected with each other.

An operation of the switching control circuit 1303 is described in detail.

First, the switching control circuit 1303 measures the voltage of each of the plurality of battery cells 1309. Then, the switching control circuit 1303 determines that the battery cell 1309 having a voltage higher than a predetermined threshold value is a high-voltage battery cell (high-voltage cell) and that a battery cell 1309 having a voltage lower than the predetermined threshold value is a low-voltage battery cell (low-voltage cell), for example.

As a method to determine whether a battery cell is a high-voltage cell or a low-voltage cell, any of various methods can be employed. For example, the switching control circuit 1303 may determine whether each battery cell 1309 is a high-voltage cell or a low-voltage cell on the basis of the voltage of a battery cell 1309 having the highest voltage or the lowest voltage among the plurality of battery cells 1309. In this case, the switching control circuit 1303 can determine whether each battery cell 1309 is a high-voltage cell or a low-voltage cell by determining whether or not a ratio of a voltage of each battery cell 1309 to the reference voltage is the predetermined value or more. Then, the switching control circuit 1303 determines a charge battery cell group and a discharge battery cell group on the basis of the determination result.

Note that high-voltage cells and low-voltage cells are mixed in various states in the plurality of battery cells 1309. For example, the switching control circuit 1303 selects a portion having the largest number of high-voltage cells connected in series as the discharge battery cell group of mixed high-voltage cells and low-voltage cells. Furthermore, the switching control circuit 1303 selects a portion having the largest number of low-voltage cells connected in series as the charge battery cell group. In addition, the switching control circuit 1303 may preferentially select battery cells 1309 which are near overcharge or overdischarge as the discharge battery cell group or the charge battery cell group.

Figure 18A:
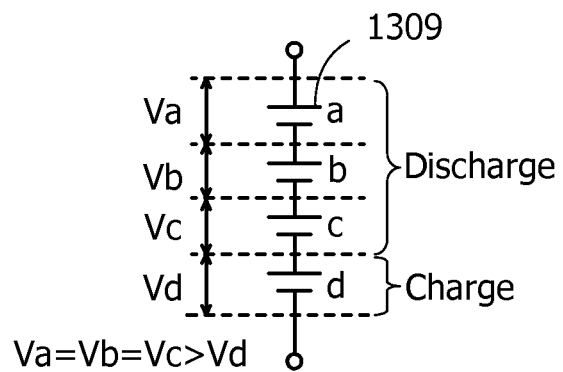
FIGS. 18A to 18C are schematic views for describing one embodiment of the present invention.
Figure 18B:
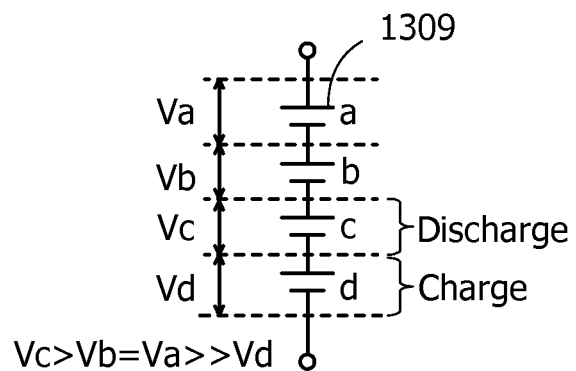
Figure 18C:
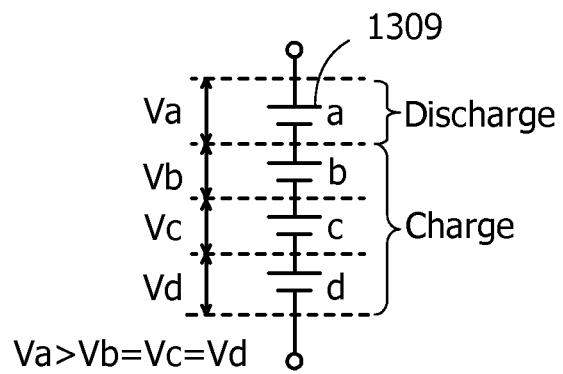

Here, operation examples of the switching control circuit 1303 in this embodiment are described with reference to FIGS. 18A to 18C. FIGS. 18A to 18C illustrate operation examples of the switching control circuit 1303. Note that FIGS. 18A to 18C each illustrate the case where four battery cells 1309 are connected in series as an example for convenience of explanation.

FIG. 18A shows the case where the relation of voltages Va, Vb, Vc, and Vd is Va=Vb=Vc>Vd where the voltages Va, Vb, Vc, and Vd are voltages of a battery cell 1309a, a battery cell 1309b, a battery cell 1309c, and a battery cell 1309d, respectively. That is, a series of three high-voltage cells 1309a to 1309c and one low-voltage cell 1309d are connected in series. In that case, the switching control circuit 1303 selects the series of three high-voltage cells 1309a to 1309c as the discharge battery cell group. In addition, the switching control circuit 1303 selects the low-voltage cell 1309d as the charge battery cell group.

Next, FIG. 18B shows the case where the relation of the voltages is Vc>Vb=Va>>Vd. That is, a series of two low-voltage cells 1309a and 1309b, one high-voltage cell 1309c, and one low-voltage cell 1309d which is close to overdischarge are connected in series. In that case, the switching control circuit 1303 selects the high-voltage cell 1309c as the discharge battery cell group. Since the low-voltage cell 1309d is close to overdischarge, the switching control circuit 1303 preferentially selects the low-voltage cell 1309d as the charge battery cell group instead of the series of two low-voltage cells 1309a and 1309b.

Lastly, FIG. 18C shows the case where the relation of voltages is Va>Vb=Vc=Vd. That is, one high-voltage cell 1309a and a series of three low-voltage cells 1309b to 1309d are connected in series. In that case, the switching control circuit 1303 selects the high-voltage cell 1309a as the discharge battery cell group. In addition, the switching control circuit 1303 selects the series of three low-voltage cells 1309b to 1309d as the charge battery cell group.

On the basis of the determination result shown in the examples of FIGS. 18A to 18C, the switching control circuit 1303 outputs the control signal S1 and the control signal S2 to the switching circuit 1304 and the switching circuit 1305, respectively. Information showing the discharge battery cell group being the connection destination of the switching circuit 1304 is set in the control signal S1. Information showing the charge battery cell group being a connection destination of the switching circuit 1305 is set in the control signal S2.

The above is the detailed description of the operation of the switching control circuit 1303.

The switching circuit 1304 sets the discharge battery cell group selected by the switching control circuit 1303 as the connection destination of the terminal pair 1301 in response to the control signal S1 output from the switching control circuit 1303.

The terminal pair 1301 includes a pair of terminals A1 and A2. The switching circuit 1304 sets the connection destination of the terminal pair 1301 by connecting one of the pair of terminals A1 and A2 to a positive electrode terminal of a battery cell 1309 positioned on the most upstream side (on the high potential side) of the discharge battery cell group, and the other to a negative electrode terminal of a battery cell 1309 positioned on the most downstream side (on the low potential side) of the discharge battery cell group. Note that the switching circuit 1304 can recognize the position of the discharge battery cell group on the basis of the information set in the control signal S1.

The switching circuit 1305 sets the charge battery cell group selected by the switching control circuit 1303 as the connection destination of the terminal pair 1302 in response to the control signal S2 output from the switching control circuit 1303.

The terminal pair 1302 includes a pair of terminals B1 and B2. The switching circuit 1305 sets the connection destination of the terminal pair 1301 by connecting one of the pair of terminals B1 and B2 to a positive electrode terminal of a battery cell 1309 positioned on the most upstream side (on the high potential side) of the charge battery cell group, and the other to a negative electrode terminal of a battery cell 1309 positioned on the most downstream side (on the low potential side) of the charge battery cell group. Note that the switching circuit 1305 can recognize the position of the charge battery cell group on the basis of the information set in the control signal S2.

Figure 19:
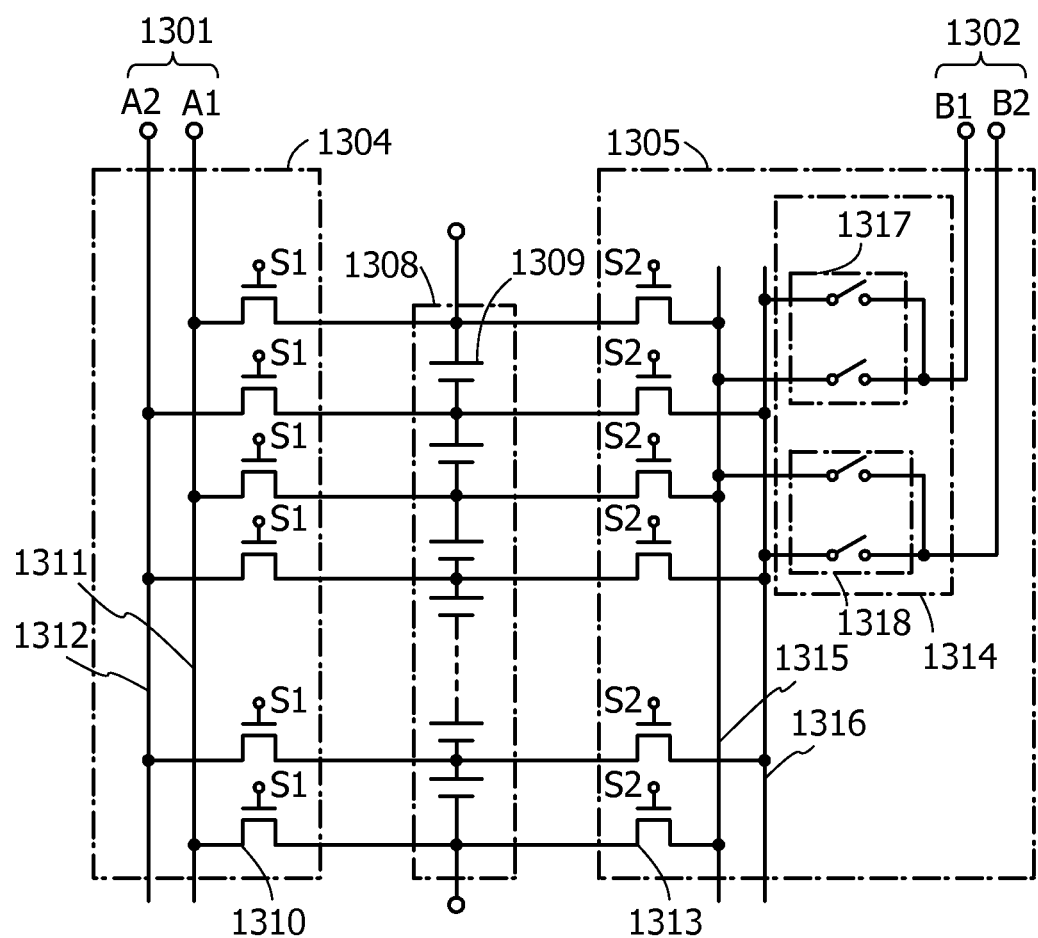
FIG. 19 is a circuit diagram illustrating one embodiment of the present invention.
Figure 20:
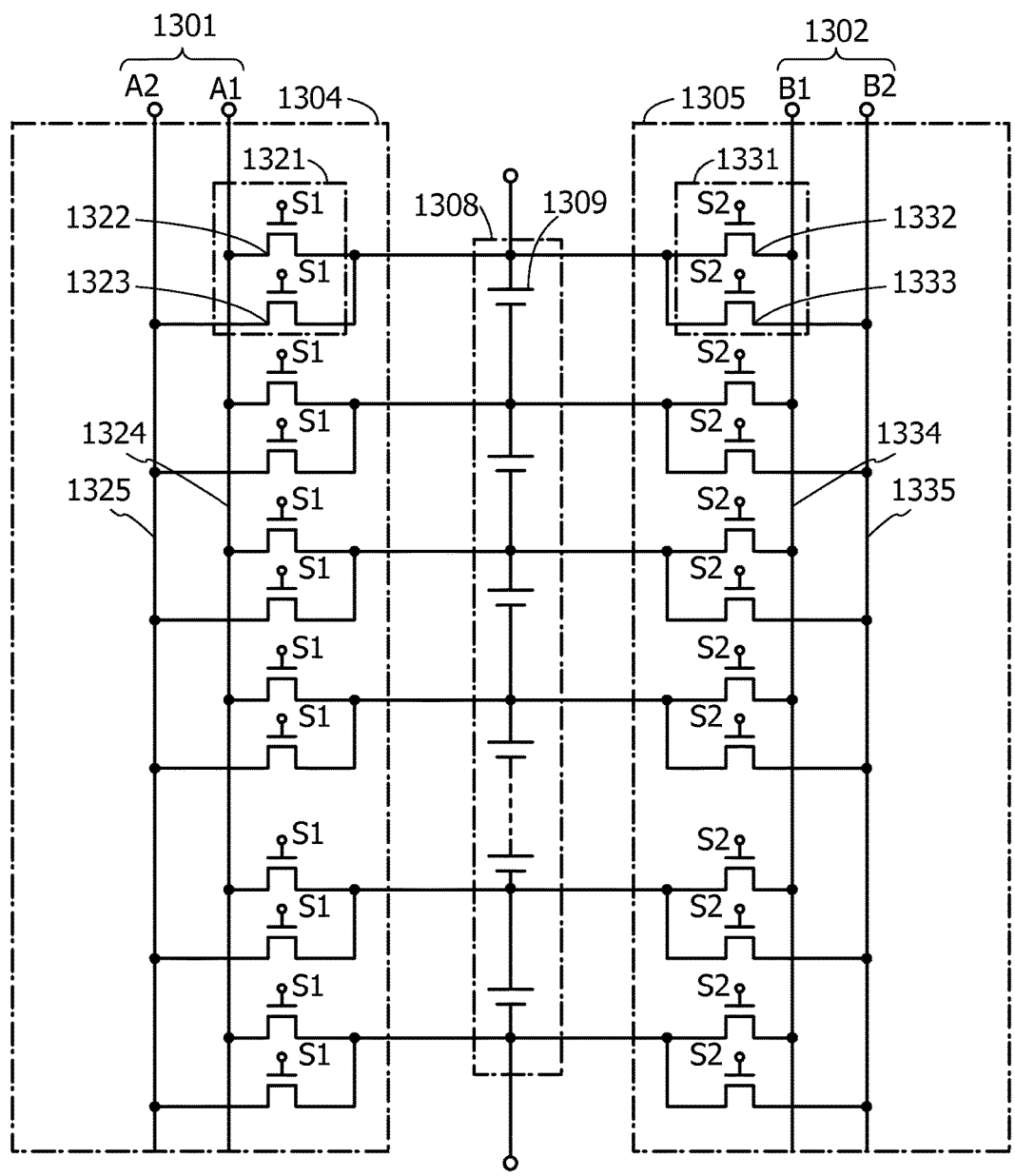
FIG. 20 is a circuit diagram illustrating one embodiment of the present invention.

FIG. 19 and FIG. 20 are circuit diagrams showing configuration examples of the switching circuits 1304 and 1305.

In FIG. 19, the switching circuit 1304 includes a plurality of the transistors 1310, a bus 1311, and a bus 1312. The bus 1311 is connected to the terminal A1. The bus 1312 is connected to the terminal A2. Sources or drains of the plurality of transistors 1310 are connected alternately to the bus 1311 and the bus 1312. Sources or drains which are not connected to the bus 1311 and the bus 1312 of the plurality of the transistors 1310 are each connected between two adjacent battery cells 1309.

A source or a drain of a transistor 1310 which is not connected to the bus 1311 on the most upstream side of the plurality of transistors 1310 is connected to a positive electrode terminal of a battery cell 1309 on the most upstream side of the battery portion 1308. A source or a drain of a transistor 1310 which is not connected to the bus 1311 on the most downstream side of the plurality of transistors 1310 is connected to a negative electrode terminal of a battery cell 1309 on the most downstream side of the battery portion 1308.

The switching circuit 1304 connects the discharge battery cell group to the terminal pair 1301 by bringing one of the plurality of transistors 1310 which are connected to the bus 1311 and one of the plurality of transistors 1310 which are connected to the bus 1312 into an on state in response to the control signal S1 supplied to gates of the plurality of transistors 1310. Accordingly, the positive electrode terminal of the battery cell 1309 on the most upstream side of the discharge battery cell group is connected to one of the pair of terminals A1 and A2. In addition, the negative electrode terminal of the battery cell 1309 on the most downstream side of the discharge battery cell group is connected to the other of the pair of terminals A1 and A2 (i.e., a terminal which is not connected to the positive electrode terminal).

OS transistors are preferably used as the transistors 1310. Since the off-state current of the OS transistor is low, the amount of electric charge leaking from battery cells which do not belong to the discharge battery cell group can be reduced, and reduction in capacity with the lapse of time can be suppressed. In addition, dielectric breakdown is unlikely to occur in the OS transistor when a high voltage is applied. Therefore, the battery cell 1309 and the terminal pair 1301, which are connected to the transistor 1310 in an off state, can be insulated from each other even when an output voltage of the discharge battery cell group is high.

In FIG. 19, the switching circuit 1305 includes a plurality of transistors 1313, a current control switch 1314, a bus 1315, and a bus 1316. The bus 1315 and the bus 1316 are provided between the plurality of transistors 1313 and the current control switch 1314. Sources or drains of the plurality of transistors 1313 are connected alternately to the bus 1315 and the bus 1316. Sources or drains which are not connected to the bus 1315 and the bus 1316 of the plurality of transistors 1313 are each connected between two adjacent battery cells 1309.

A source or a drain of a transistor 1313 which is not connected to the bus 1315 on the most upstream side of the plurality of transistors 1313 is connected to the positive electrode terminal of the battery cell 1309 on the most upstream side of the battery portion 1308. A source or a drain of a transistor 1313 which is not connected to the bus 1315 on the most downstream side of the plurality of transistors 1313 is connected to the negative electrode terminal of the battery cell 1309 on the most downstream side of the battery portion 1308.

OS transistors are preferably used as the transistors 1313 like the transistors 1310. Since the off-state current of the OS transistor is low, the amount of electric charge leaking from the battery cells which do not belong to the charge battery cell group can be reduced, and reduction in capacity with the lapse of time can be suppressed. In addition, dielectric breakdown is unlikely to occur in the OS transistor when a high voltage is applied. Therefore, the battery cell 1309 and the terminal pair 1302, which are connected to the transistor 1313 in an off state, can be insulated from each other even when a voltage for charging the charge battery cell group is high.

The current control switch 1314 includes a switch pair 1317 and a switch pair 1318. One end of the switch pair 1317 is connected to the terminal B1. The other ends of the switch pair 1317 extending from respective switches are connected to two different buses. One switch is connected to a bus 1315. The other switch is connected to a bus 1316. One end of the switch pair 1318 is connected to the terminal B2. The other ends of the of the switch pair 1318 extending from respective switches are connected to two different buses. One switch is connected to the bus 1315, and the other switch is connected to the bus 1316.

OS transistors are preferably used for the switches included in the switch pair 1317 and the switch pair 1318 like the transistors 1310 and 1313.

The switching circuit 1305 connects the charge battery cell group and the terminal pair 1302 by controlling the combination of on and off states of the transistors 1313 and the current control switch 1314 in response to the control signal S2.

For example, the switching circuit 1305 connects the charge battery cell group and the terminal pair 1302 in the following manner.

The switching circuit 1305 brings a transistor 1313 connected to the positive electrode terminal of a battery cell 1309 on the most upstream side of the charge battery cell group into an on state in response to the control signal S2 supplied to gates of the plurality of transistors 1313. In addition, the switching circuit 1305 brings a transistor 1313 connected to the negative electrode terminal of a battery cell 1309 on the most downstream side of the charge battery cell group into an on state in response to the control signal S2 supplied to the gates of the plurality of transistors 1313.

The polarities of voltages applied to the terminal pair 1302 can vary in accordance with the connection structures of the voltage transformer circuit 1307 and the discharge battery cell group connected to the terminal pair 1301. In order to supply current in a direction for charging the charge battery cell group, terminals with the same polarity of the terminal pair 1302 and the charge battery cell group are required to be connected. In view of this, the current control switch 1314 is controlled by the control signal S2 so that the connection destination of the switch pair 1317 and that of the switch pair 1318 are changed in accordance with the polarities of the voltages applied to the terminal pair 1302.

The state where voltages are applied to the terminal pair 1302 so as to make the terminal B1 a positive electrode and the terminal B2 a negative electrode is described as an example. Here, in the case where the battery cell 1309 positioned on the most downstream side of the battery portion 1308 is in the charge battery cell group, the switch pair 1317 is controlled to be connected to the positive electrode terminal of the battery cell 1309 in response to the control signal S2. That is, the switch of the switch pair 1317 connected to the bus 1316 is turned on, and the switch of the switch pair 1317 connected to the bus 1315 is turned off. In contrast, the switch pair 1318 is controlled to be connected to the negative electrode terminal of the battery cell 1309 positioned on the most downstream side of the battery portion 1308 in response to the control signal S2. That is, the switch of the switch pair 1318 connected to the bus 1315 is turned on, and the switch of the switch pair 1318 connected to the bus 1316 is turned off. In this manner, terminals with the same polarity of the terminal pair 1302 and the charge battery cell group are connected to each other. In addition, the current which flows from the terminal pair 1302 is controlled to be supplied in a direction so as to charge the charge battery cell group.

In addition, instead of the switching circuit 1305, the switching circuit 1304 may include the current control switch 1314. In that case, the polarities of the voltages applied to the terminal pair 1302 are controlled by controlling the polarities of the voltages applied to the terminal pair 1301 in response to the operation of the current control switch 1314 and the control signal S1. Thus, the current control switch 1314 controls the direction of current which flows to the charge battery cell group from the terminal pair 1302.

FIG. 20 is a circuit diagram illustrating structure examples of the switching circuit 1304 and the switching circuit 1305 which are different from those of FIG. 19.

In FIG. 20, the switching circuit 1304 includes a plurality of transistor pairs 1321, a bus 1324, and a bus 1325. The bus 1324 is connected to the terminal A1. The bus 1325 is connected to the terminal A2. One ends of the plurality of transistor pairs 1321 each extending from a transistor 1322 and a transistor 1323 are connected to two different buses. Sources or drains of the transistors 1322 are connected to the bus 1324. Sources or drains of the transistors 1323 are connected to the bus 1325. In addition, the other ends of the plurality of transistor pairs are each connected between two adjacent battery cells 1309. The other end of the transistor pair 1321 on the most upstream side of the plurality of transistor pairs 1321 is connected to the positive electrode terminal of the battery cell 1309 on the most upstream side of the battery portion 1308. The other end of the transistor pair 1321 on the most downstream side of the plurality of transistor pairs 1321 is connected to a negative electrode terminal of the battery cell 1309 on the most downstream side of the battery portion 1308.

The switching circuit 1304 switches the connection destination of the transistor pair 1321 to one of the terminal A1 and the terminal A2 by turning on or off the transistors 1322 and 1323 in response to the control signal S1. Specifically, when the transistor 1322 is turned on, the transistor 1323 is turned off, so that the connection destination of the transistor pair 1321 is the terminal A1. On the other hand, when the transistor 1323 is turned on, the transistor 1322 is turned off, so that the connection destination of the transistor pair 1321 is the terminal A2. Which of the transistors 1322 and 1323 is turned on is determined by the control signal S1.

Two transistor pairs 1321 are used to connect the terminal pair 1301 and the discharge battery cell group. Specifically, the connection destinations of the two transistor pairs 1321 are determined on the basis of the control signal S1, and the discharge battery cell group and the terminal pair 1301 are connected. The connection destinations of the two transistor pairs 1321 are controlled by the control signal S1 so that one of the connection destinations is the terminal A1 and the other is the terminal A2.

The switching circuit 1305 includes a plurality of transistor pairs 1331, a bus 1334, and a bus 1335. The bus 1334 is connected to the terminal B1. The bus 1335 is connected to the terminal B2. One ends of the plurality of transistor pairs 1331 each extending from a transistor 1332 and a transistor 1333 are connected to two different buses. Sources or drains of the transistors 1332 are connected to the bus 1334. Sources or drains of the transistors 1333 are connected to the bus 1335. The other ends of the plurality of transistor pairs 1331 are each connected between two adjacent battery cells 1309. The other end of the transistor pair 1331 on the most upstream side of the plurality of transistor pairs 1331 is connected to the positive electrode terminal of the battery cell 1309 on the most upstream side of the battery portion 1308. The other end of the transistor pair 1331 on the most downstream side of the plurality of transistor pairs 1331 is connected to the negative electrode terminal of the battery cell 1309 on the most downstream side of the battery portion 1308.

The switching circuit 1305 switches the connection destination of the transistor pair 1331 to one of the terminal B1 and the terminal B2 by turning on or off the transistors 1332 and 1333 in response to the control signal S2. Specifically, when the transistor 1332 is turned on, the transistor 1333 is turned off, so that the connection destination of the transistor pair 1331 is the terminal B1. On the other hand, when the transistor 1333 is turned on, the transistor 1332 is turned off, so that the connection destination of the transistor pair 1331 is the terminal B2. Which of the transistors 1332 and 1333 is turned on is determined by the control signal S2.

Two transistor pairs 1331 are used to connect the terminal pair 1302 and the charge battery cell group. Specifically, the connection destinations of the two transistor pairs 1331 are determined on the basis of the control signal S2, and the charge battery cell group and the terminal pair 1302 are connected. The connection destinations of the two transistor pairs 1331 are controlled by the control signal S2 so that one of the connection destinations is the terminal B1 and the other is the terminal B2.

The connection destinations of the two transistor pairs 1331 are determined by the polarities of the voltages applied to the terminal pair 1302. Specifically, in the case where voltages which make the terminal B1 a positive electrode and the terminal B2 a negative electrode are applied to the terminal pair 1302, the transistor pair 1331 on the upstream side is controlled by the control signal S2 so that the transistor 1332 is turned on and the transistor 1333 is turned off. In contrast, the transistor pair 1331 on the downstream side is controlled by the control signal S2 so that the transistor 1333 is turned on and the transistor 1332 is turned off. In the case where voltages which make the terminal B1 a negative electrode and the terminal B2 a positive electrode are applied to the terminal pair 1302, the transistor pair 1331 on the upstream side is controlled by the control signal S2 so that the transistor 1333 is turned on and the transistor 1332 is turned off. In contrast, the transistor pair 1331 on the downstream side is controlled by the control signal S2 so that the transistor 1332 is turned on and the transistor 1333 is turned off. In this manner, terminals with the same polarity of the terminal pair 1302 and the charge battery cell group are connected to each other. In addition, the current which flows from the terminal pair 1302 is controlled to be supplied in a direction for charging the charge battery cell group.

The voltage transformation control circuit 1306 controls operation of the voltage transformer circuit 1307. The voltage transformation control circuit 1306 generates a voltage transformation signal S3 for controlling the operation of the voltage transformer circuit 1307 on the basis of the number of the battery cells 1309 included in the discharge battery cell group and the number of the battery cells 1309 included in the charge battery cell group and outputs the voltage transformation signal S3 to the voltage transformer circuit 1307.

In the case where the number of the battery cells 1309 included in the discharge battery cell group is larger than that included in the charge battery cell group, it is necessary to prevent a charging voltage which is too high from being applied to the charge battery cell group. Thus, the voltage transformation control circuit 1306 outputs the voltage transformation signal S3 for controlling the voltage transformer circuit 1307 so that a discharging voltage (Vdis) is lowered within a range where the charge battery cell group can be charged.

In the case where the number of the battery cells 1309 included in the discharge battery cell group is less than or equal to that included in the charge battery cell group, a voltage necessary for charging the charge battery cell group needs to be secured. Therefore, the voltage transformation control circuit 1306 outputs the voltage transformation signal S3 for controlling the voltage transformer circuit 1307 so that the discharging voltage (Vdis) is raised within a range where a charging voltage which is too high is not applied to the charge battery cell group.

The voltage value of the charging voltage which is too high is determined in the light of product specifications and the like of the battery cell 1309 used in the battery portion 1308. The voltage which is raised or lowered by the voltage transformer circuit 1307 is applied as a charging voltage (Vcha) to the terminal pair 1302.

Figure 21A:
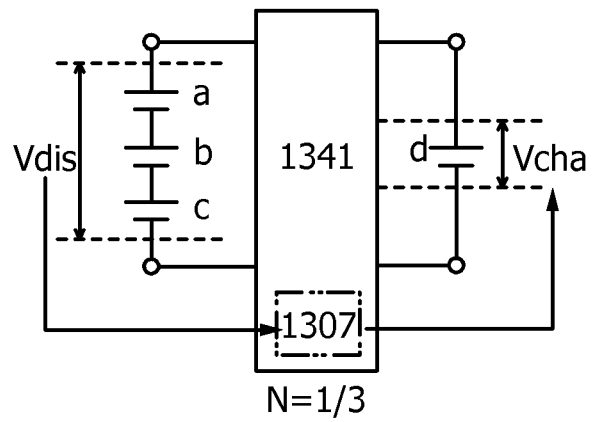
FIGS. 21A to 21C are schematic views for describing one embodiment of the present invention.
Figure 21B:
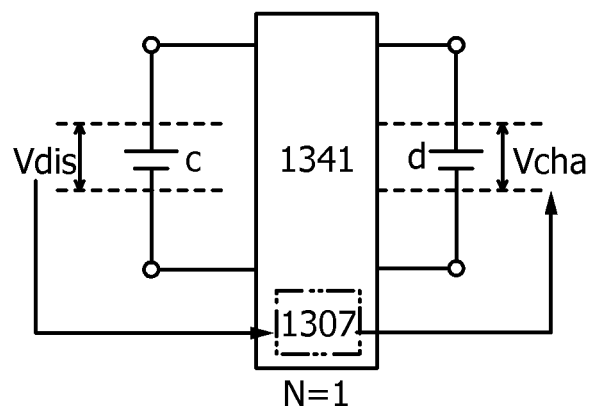
Figure 21C:
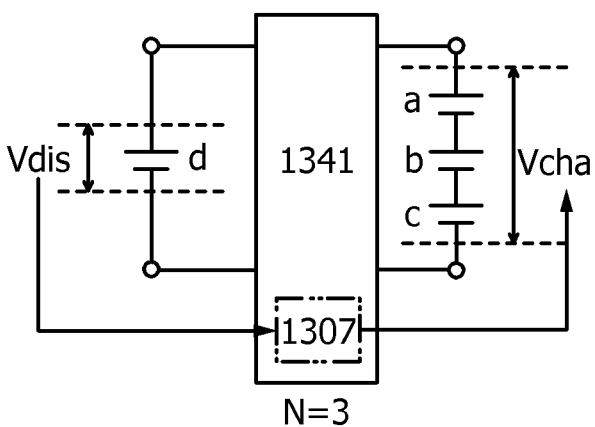

Here, operation examples of the voltage transformation control circuit 1306 in this embodiment are described with reference to FIGS. 21A to 21C. FIGS. 21A to 21C are conceptual diagrams for explaining the operation examples of the voltage transformation control circuit 1306 corresponding to the discharge battery cell group and the charge battery cell group described in FIGS. 18A to 18C. FIGS. 21A to 21C each illustrate a battery control unit 1341. The battery control unit 1341 includes the terminal pair 1301, the terminal pair 1302, the switching control circuit 1303, the switching circuit 1304, the switching circuit 1305, the voltage transformation control circuit 1306, and the voltage transformer circuit 1307.

In an example illustrated in FIG. 21A, the series of three high-voltage cells 1309a to 1309c and one low-voltage cell 1309d are connected in series as described in FIG. 18A. In that case, as described using FIG. 18A, the switching control circuit 1303 selects the high-voltage cells 1309a to 1309c as the discharge battery cell group, and selects the low-voltage cell 1309d as the charge battery cell group. The voltage transformation control circuit 1306 calculates a conversion ratio N for converting the discharging voltage (Vdis) to the charging voltage (Vcha) based on the ratio of the number of the battery cells 1309 included in the charge battery cell group to the number of the battery cells 1309 included in the discharge battery cell group.

In the case where the number of the battery cells 1309 included in the discharge battery cell group is larger than that included in the charge battery cell group, when a discharging voltage is applied to the terminal pair 1302 without transforming the voltage, overvoltage may be applied to the battery cells 1309 included in the charge battery cell group through the terminal pair 1302. Thus, in the case of FIG. 21A, it is necessary that a charging voltage (Vcha) applied to the terminal pair 1302 be lower than the discharging voltage. In addition, in order to charge the charge battery cell group, it is necessary that the charging voltage be higher than the total voltage of the battery cells 1309 included in the charge battery cell group. Thus, the voltage transformation control circuit 1306 sets the conversion ratio N larger than the ratio of the number of the battery cells 1309 included in the charge battery cell group to the number of the battery cells 1309 included in the discharge battery cell group.

Thus, the voltage transformation control circuit 1306 preferably sets the conversion ratio N larger than the ratio of the number of the battery cells 1309 included in the charge battery cell group to the number of the battery cells 1309 included in the discharge battery cell group by about 1% to 10%. Here, the charging voltage is made higher than the voltage of the charge battery cell group, but the charging voltage is equal to the voltage of the charge battery cell group in reality. Note that the voltage transformation control circuit 1306 feeds a current for charging the charge battery cell group in accordance with the conversion ratio N in order to make the voltage of the charge battery cell group equal to the charging voltage. The value of the current is set by the voltage transformation control circuit 1306.

In the example illustrated in FIG. 21A, since the number of the battery cells 1309 included in the discharge battery cell group is three and the number of the battery cells 1309 included in the charge battery cell group is one, the voltage transformation control circuit 1306 calculates a value which is slightly larger than ⅓ as the conversion ratio N. Then, the voltage transformation control circuit 1306 outputs the voltage transformation signal S3, which lowers the discharging voltage in accordance with the conversion ratio N and converts the voltage into a charging voltage, to the voltage transformer circuit 1307. The voltage transformer circuit 1307 applies the charging voltage which is obtained by transformation in response to the voltage transformation signal S3 to the terminal pair 1302. Then, the battery cells 1309 included in the charge battery cell group are charged with the charging voltage applied to the terminal pair 1302.

In each of examples illustrated in FIGS. 21B and 21C, the conversion ratio N is calculated in a manner similar to that of FIG. 21A. In each of the examples illustrated in FIGS. 21B and 21C, since the number of the battery cells 1309 included in the discharge battery cell group is less than or equal to the number of the battery cells 1309 included in the charge battery cell group, the conversion ratio N is 1 or more. Therefore, in this case, the voltage transformation control circuit 1306 outputs the voltage transformation signal S3 for raising the discharging voltage and converting the voltage into the charging voltage.

The voltage transformer circuit 1307 converts the discharging voltage applied to the terminal pair 1301 into a charging voltage on the basis of the voltage transformation signal S3. The voltage transformer circuit 1307 applies the converted charging voltage to the terminal pair 1302. Here, the voltage transformer circuit 1307 electrically insulates the terminal pair 1301 from the terminal pair 1302. Accordingly, the voltage transformer circuit 1307 prevents a short circuit due to a difference between the absolute voltage of the negative electrode terminal of the battery cell 1309 on the most downstream side of the discharge battery cell group and the absolute voltage of the negative electrode terminal of the battery cell 1309 on the most downstream side of the charge battery cell group. Furthermore, the voltage transformer circuit 1307 converts the discharging voltage, which is the total voltage of the discharge battery cell group, into the charging voltage on the basis of the voltage transformation signal S3 as described above.

An insulated direct current (DC)-DC converter or the like can be used in the voltage transformer circuit 1307. In that case, the voltage transformation control circuit 1306 controls the charging voltage converted by the voltage transformer circuit 1307 by outputting a signal for controlling the on/off ratio (the duty ratio) of the insulated DC-DC converter as the voltage transformation signal S3.

Examples of the insulated DC-DC converter include a flyback converter, a forward converter, a ringing choke converter (RCC), a push-pull converter, a half-bridge converter, and a full-bridge converter, and a suitable converter is selected in accordance with the value of the intended output voltage.

Figure 22:
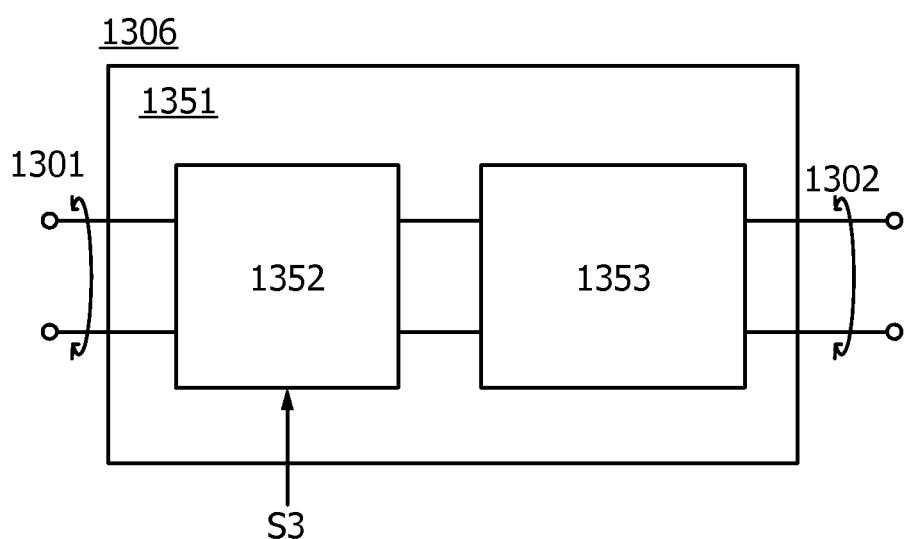
FIG. 22 is a block diagram showing one embodiment of the present invention.

The structure of the voltage transformer circuit 1307 including the insulated DC-DC converter is illustrated in FIG. 22. An insulated DC-DC converter 1351 includes a switch portion 1352 and a transformer 1353. The switch portion 1352 is a switch for switching on/off of the insulated DC-DC converter, and a metal oxide semiconductor field-effect transistor (MOSFET), a bipolar transistor, or the like is used as the switch portion 1352. The switch portion 1352 periodically turns on and off the insulated DC-DC converter 1351 in accordance with the voltage transformation signal S3 controlling the on/off ratio which is output from the voltage transformation control circuit 1306. The switch portion 1352 can have any of various structures in accordance with the type of the insulated DC-DC converter which is used. The transformer 1353 converts the discharging voltage applied from the terminal pair 1301 into the charging voltage. In detail, the transformer 1353 operates in conjunction with the on/off state of the switch portion 1352 and converts the discharging voltage into the charging voltage in accordance with the on/off ratio. As the time during which the switch portion 1352 is on becomes longer in its switching period, the charging voltage is increased. On the other hand, as the time during which the switch portion 1352 is on becomes shorter in its switching period, the charging voltage is decreased. In the case where the insulated DC-DC converter is used, the terminal pair 1301 and the terminal pair 1302 can be insulated from each other inside the transformer 1353.

Figure 23:
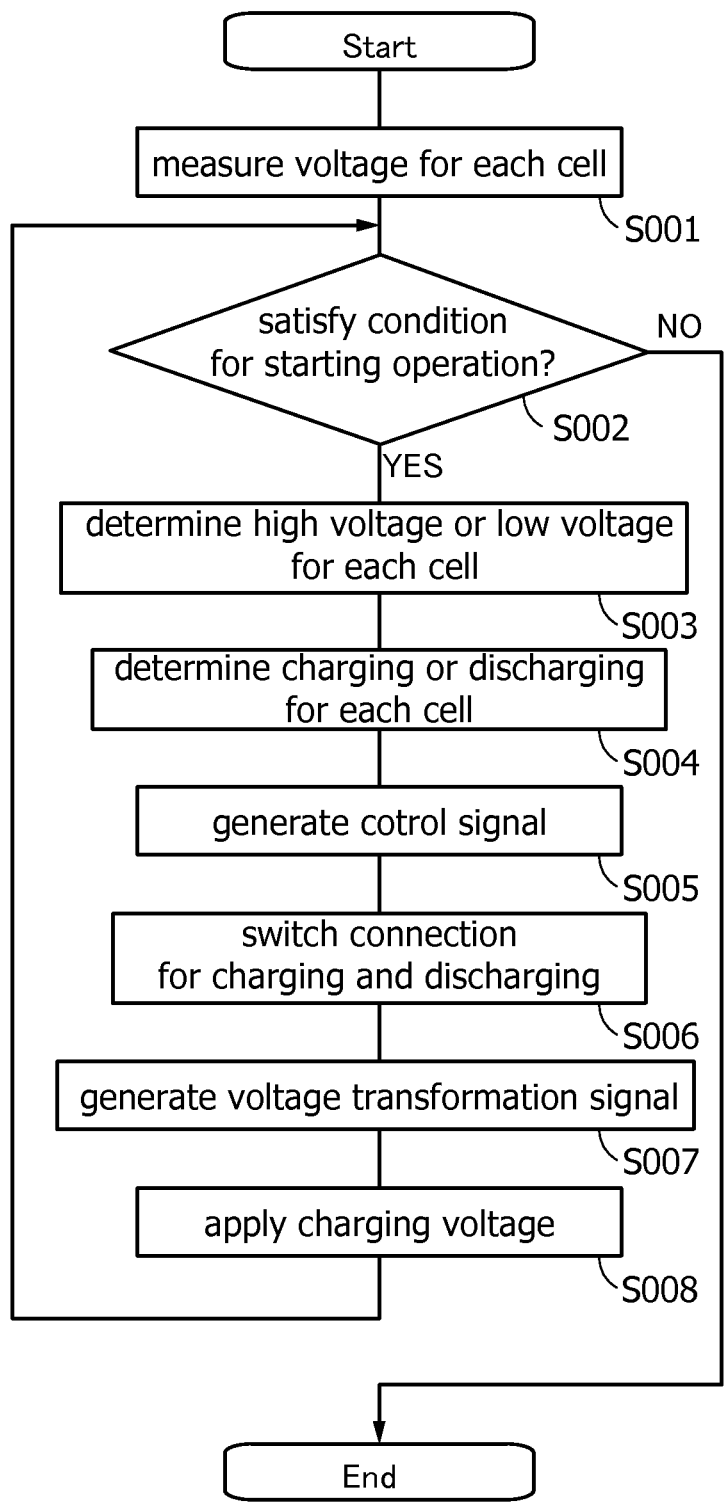
FIG. 23 is a flow chart showing one embodiment of the present invention.

A flow of operation of the power storage device 1300 in this embodiment is described with reference to FIG. 23. FIG. 23 is a flow chart illustrating the flow of the operation of the power storage device 1300.

First, the power storage device 1300 obtains a voltage measured for each of the plurality of battery cells 1309 (step S001). Then, the power storage device 1300 determines whether or not the condition for starting the operation of reducing variation in voltages of the plurality of battery cells 1309 is satisfied (step S002). An example of the condition can be that the difference between the maximum value and the minimum value of the voltage measured for each of the plurality of battery cells 1309 is higher than or equal to the predetermined threshold value. In the case where the condition is not satisfied (step S002: NO), the power storage device 1300 does not perform the following operation because voltages of the battery cells 1309 are well balanced. In contrast, in the case where the condition is satisfied (step S002: YES), the power storage device 1300 performs the operation of reducing variation in the voltages of the battery cells 1309. In this operation, the power storage device 1300 determines whether each battery cell 1309 is a high-voltage cell or a low-voltage cell on the basis of the measured voltage of each cell (step S003). Then, the power storage device 1300 determines a discharge battery cell group and a charge battery cell group on the basis of the determination result (step S004). In addition, the power storage device 1300 generates the control signal S1 for setting the determined discharge battery cell group as the connection destination of the terminal pair 1301, and the control signal S2 for setting the determined charge battery cell group as the connection destination of the terminal pair 1302 (step S005). The power storage device 1300 outputs the generated control signals S1 and S2 to the switching circuit 1304 and the switching circuit 1305, respectively. Then, the switching circuit 1304 connects the terminal pair 1301 and the discharge battery cell group, and the switching circuit 1305 connects the terminal pair 1302 and the discharge battery cell group (step S006). The power storage device 1300 generates the voltage transformation signal S3 based on the number of the battery cells 1309 included in the discharge battery cell group and the number of the battery cells 1309 included in the charge battery cell group (step S007). Then, the power storage device 1300 converts the discharging voltage applied to the terminal pair 1301 into a charging voltage based on the voltage transformation signal S3 and applies the charging voltage to the terminal pair 1302 (step S008). In this way, electric charge of the discharge battery cell group is transferred to the charge battery cell group.

Although the plurality of steps are shown in order in the flow chart of FIG. 23, the order of performing the steps is not limited to the order.

According to the above embodiment, when an electric charge is transferred from the discharge battery cell group to the charge battery cell group, a structure where an electric charge from the discharge battery cell group is temporarily stored, and the stored electric charge is sent to the charge battery cell group is unnecessary, unlike in the a capacitor type circuit. Accordingly, the charge transfer efficiency per unit time can be increased. In addition, the switching circuit 1304 and the switching circuit 1305 determine which battery cell in the discharge battery cell group and the charge battery cell group to be connected to the voltage transformer circuit.

Furthermore, the voltage transformer circuit 1307 converts the discharging voltage applied to the terminal pair 1301 into the charging voltage based on the number of the battery cells 1309 included in the discharge battery cell group and the number of the battery cells 1309 included in the charge battery cell group, and applies the charging voltage to the terminal pair 1302. Thus, even when any battery cell 1309 is selected as the discharge battery cell group and the charge battery cell group, an electric charge can be transferred without any problems.

Furthermore, the use of OS transistors as the transistor 1310 and the transistor 1313 can reduce the amount of electric charge leaking from the battery cells 1309 which do not belong to the charge battery cell group or the discharge battery cell group. Accordingly, a decrease in capacity of the battery cells 1309 which do not contribute to charging or discharging can be suppressed. In addition, the variation in characteristics of the OS transistor due to heat is smaller than that of an Si transistor. Accordingly, even when the temperature of the battery cells 1309 is increased, an operation such as turning on or off the transistors in response to the control signals S1 and S2 can be performed normally.

This application is based on Japanese Patent Application serial no. 2014-214146 filed with Japan Patent Office on Oct. 21, 2014, and Japanese Patent Application serial no. 2014-219174 filed with Japan Patent Office on Oct. 28, 2014, the entire contents of which are hereby incorporated by reference.

What is claimed is:
1. An apparatus comprising:
a container;
a first electrode inside the container;
a second electrode that is rolled up;
a first control device outside the container;
a first cord configured to electrically connect the first control device to the first electrode;
a second cord configured to electrically connect the first control device to the second electrode to be provided inside the container;
a gas outlet positioned inside the container and directly under a bottom of the second electrode;
a lid configured to be put on a top of the container;
an exhaust port provided on the lid; and
a cover in contact with the second electrode,
wherein the cover is positioned between the second electrode and the gas outlet.

2. The apparatus according to claim 1, wherein the first electrode is provided at a bottom of the container.

3. The apparatus according to claim 1, wherein the gas outlet is coupled with a pipe introduced inside the container through the exhaust port.

4. The apparatus according to claim 3, wherein the pipe is provided with a second control device outside the container.

5. The apparatus according to claim 3, wherein the pipe is coupled with the first control device.

6. The apparatus according to claim 1, comprising a heater adjacent to the container.

7. The apparatus according to claim 6, wherein the heater is provided outside the container.

8. An apparatus comprising:
a container;
a first electrode inside the container;
a second electrode that is rolled up;
a first control device outside the container;
a first cord configured to electrically connect the first control device to the first electrode;
a second cord configured to electrically connect the first control device to the second electrode to be provided inside the container;
a gas outlet positioned inside the container and directly under a bottom of the second electrode;
a cooler over the container, wherein the cooler has a shape projecting toward the container; and
a cover in contact with the second electrode,
wherein the cover is positioned between the second electrode and the gas outlet.

9. The apparatus according to claim 8, comprising a heater adjacent to the container.

10. The apparatus according to claim 9, wherein the heater is provided outside the container.

11. The apparatus according to claim 8, comprising a second control device coupled with the cooler through a first pipe and a second pipe.

12. The apparatus according to claim 1, wherein the second electrode is wound one or more times.

13. The apparatus according to claim 1, wherein the gas outlet is projected toward the bottom of the second electrode.

14. The apparatus according to claim 8, wherein the second electrode is wound one or more times.

* * * * *